United States Patent [19]

Fukuta et al.

[11] Patent Number: 5,090,011
[45] Date of Patent: Feb. 18, 1992

[54] PACKET CONGESTION CONTROL METHOD AND PACKET SWITCHING EQUIPMENT

[75] Inventors: Isao Fukuta; Kenji Kawakita, both of Yokohama; Jiro Kashio, Kawasaki; Yutaka Torii; Shinobu Gohara, both of Yokohama; Noboru Endo, Hachioji, all of Japan

[73] Assignee: Hitachi, Ltd., Tokyo, Japan

[21] Appl. No.: 455,135

[22] Filed: Dec. 21, 1989

[30] Foreign Application Priority Data

Dec. 23, 1988 [JP] Japan ............... 63-323300

[51] Int. Cl.$^5$ .............................. H04J 3/26
[52] U.S. Cl. .................... 370/60; 370/94.1; 370/55
[58] Field of Search ........... 370/13, 14, 55, 58.1–58.3, 370/60, 60.1, 61, 79, 85.1, 85.3, 85.6, 85.8, 94.1, 95.2; 340/825.06, 825.07, 825.08, 825.16, 825.17, 825.18, 825.5, 825.51, 825.52

[56] References Cited

U.S. PATENT DOCUMENTS

| | | | |
|---|---|---|---|
| 4,566,095 | 1/1986 | Devault et al. | 370/60 |
| 4,769,810 | 9/1988 | Eckberg, Jr. et al. | 370/60 |
| 4,769,811 | 9/1988 | Eckberg, Jr. et al. | 370/60 |
| 4,799,215 | 1/1989 | Suzuki | 370/60 |
| 4,839,891 | 6/1989 | Kobayashi et al. | 370/94.1 |
| 4,849,968 | 7/1989 | Turner | 370/94.1 |
| 4,920,534 | 4/1990 | Adelmann et al. | 370/94.1 |

FOREIGN PATENT DOCUMENTS 6324742 2/1988 Japan .

OTHER PUBLICATIONS

Technical Report SSE 88-56, pp. 37-42, The Institute of Electronics, Information and Communication Engineers of Japan, "A Memory Switching Architecture for ATM Switching Network".

Primary Examiner—Douglas W. Olms
Assistant Examiner—Alpus H. Hsu
Attorney, Agent, or Firm—Antonelli, Terry Stout & Kraus

[57] ABSTRACT

A packet switching equipment housing therein a plurality of pairs of an input line and an output line is provided with a monitor circuit for monitoring a packet congestion state in the packet switching equipment for each output line. When a packet congestion is detected in association with either one of the output lines, a congestion indicator is added to a packet to be delivered to the output line so as to return the packet as a congestion notice packet to an equipment as the transmission source of the packet; furthermore, the input packet is relayed via the output line to the destination equipment.

15 Claims, 29 Drawing Sheets

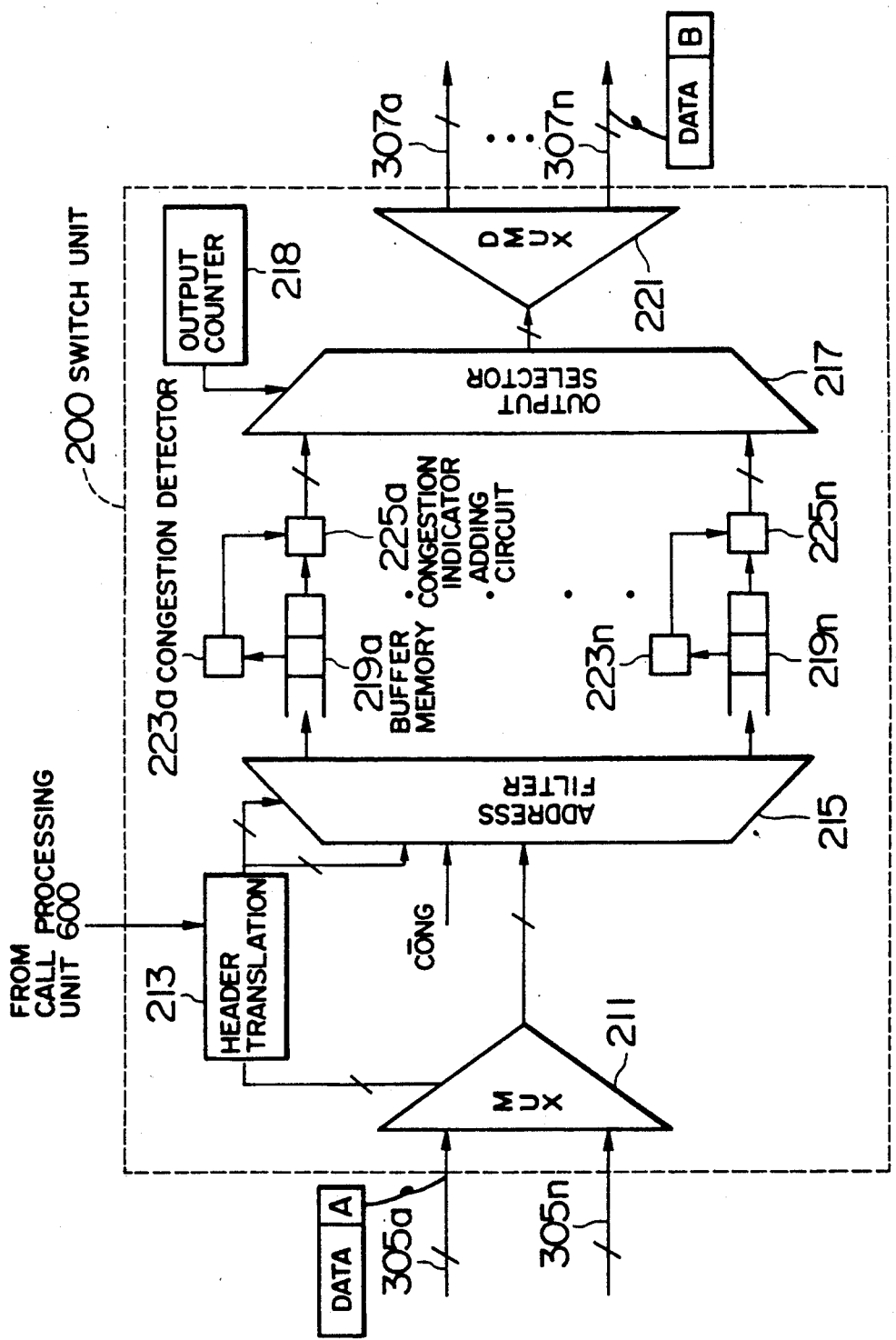

FIG. 4

| | INPUT LCN | OUTPUT LCN | OUTPUT LINE NO. |
|---|---|---|---|
| 213A FOR CONTROL CHANNEL | 0 | 0 | 0 |
| | 1 | 0 | 1 |
| | 2 | 0 | 2 |
| | ⋮ | ⋮ | ⋮ |
| | n | 0 | n |
| 213B FOR USER INFORMATION CHANNEL | n+1 | | |
| | ⋮ | ⋮ | ⋮ |
| | A | B | n |
| | ⋮ | ⋮ | ⋮ |
| | B | A | 1 |
| | ⋮ | ⋮ | ⋮ |
| | 2D 2−1 | 0 | 0 |

| \multicolumn{3}{c}{INPUT} | \multicolumn{3}{c}{OUTPUT} | |
|---|---|---|---|---|---|---|
| $ST_0$ | CONG | $TYPE_0$ | $ST_1$ | IN | $TYPE_1$ | RETURNED PACKET |
| 0 | 0 | 0 | 0 | 0 | 0 | d | |
| 0 | 0 | 0 | 1 | 0 | 0 | d | NOTHING |
| 0 | 0 | 1 | 0 | 0 | 0 | d | |
| 0 | 0 | 1 | 1 | 0 | 0 | d | |
| 0 | 1 | 0 | 0 | 1 | 1 | 0 1 | CONGESTION NOTICE PACKET |
| 0 | 1 | 0 | 1 | 1 | 1 | 0 1 | // |
| 0 | 1 | 1 | 0 | 1 | 1 | 0 1 | // |
| 0 | 1 | 1 | 1 | 1 | 1 | 0 1 | // |
| 1 | 0 | 0 | 0 | 0 | 1 | 1 0 | CONGESTION-CEASE NOTICE PACKET |
| 1 | 0 | 0 | 1 | 0 | 1 | 1 0 | // |
| 1 | 0 | 1 | 0 | 0 | 1 | 1 0 | // |
| 1 | 0 | 1 | 1 | 0 | 1 | 1 0 | // |
| 1 | 1 | 0 | 0 | 1 | 0 | d | |
| 1 | 1 | 0 | 1 | 1 | 0 | d | NOTHING |
| 1 | 1 | 1 | 0 | 1 | 0 | d | |
| 1 | 1 | 1 | 1 | 1 | 0 | d | |

900 d : DON'T CARE

FIG. IIA
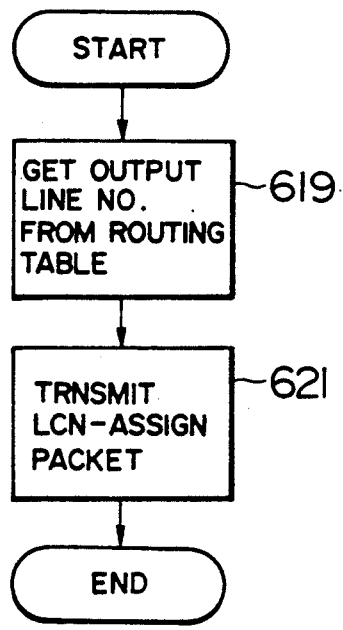
FIG. IIB
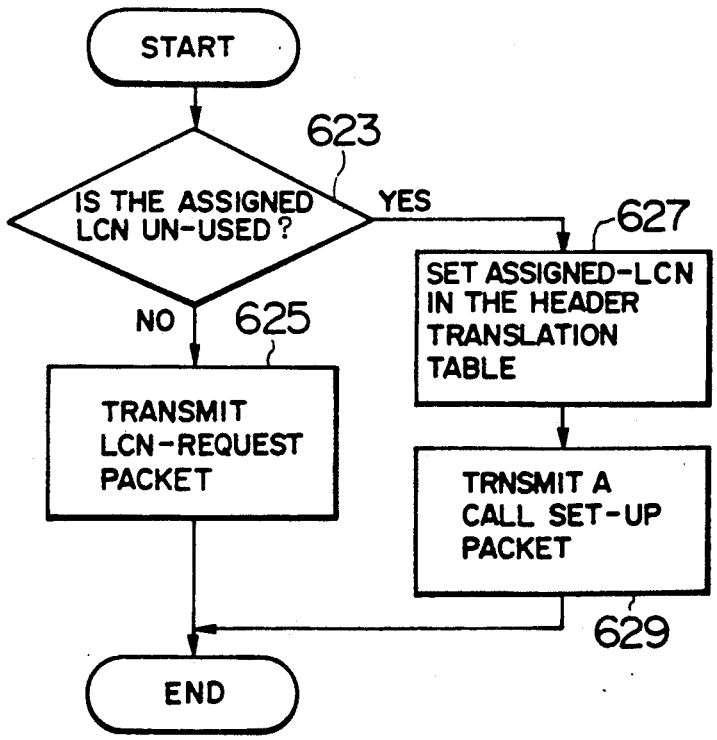
FIG. IIC

F I G. 13
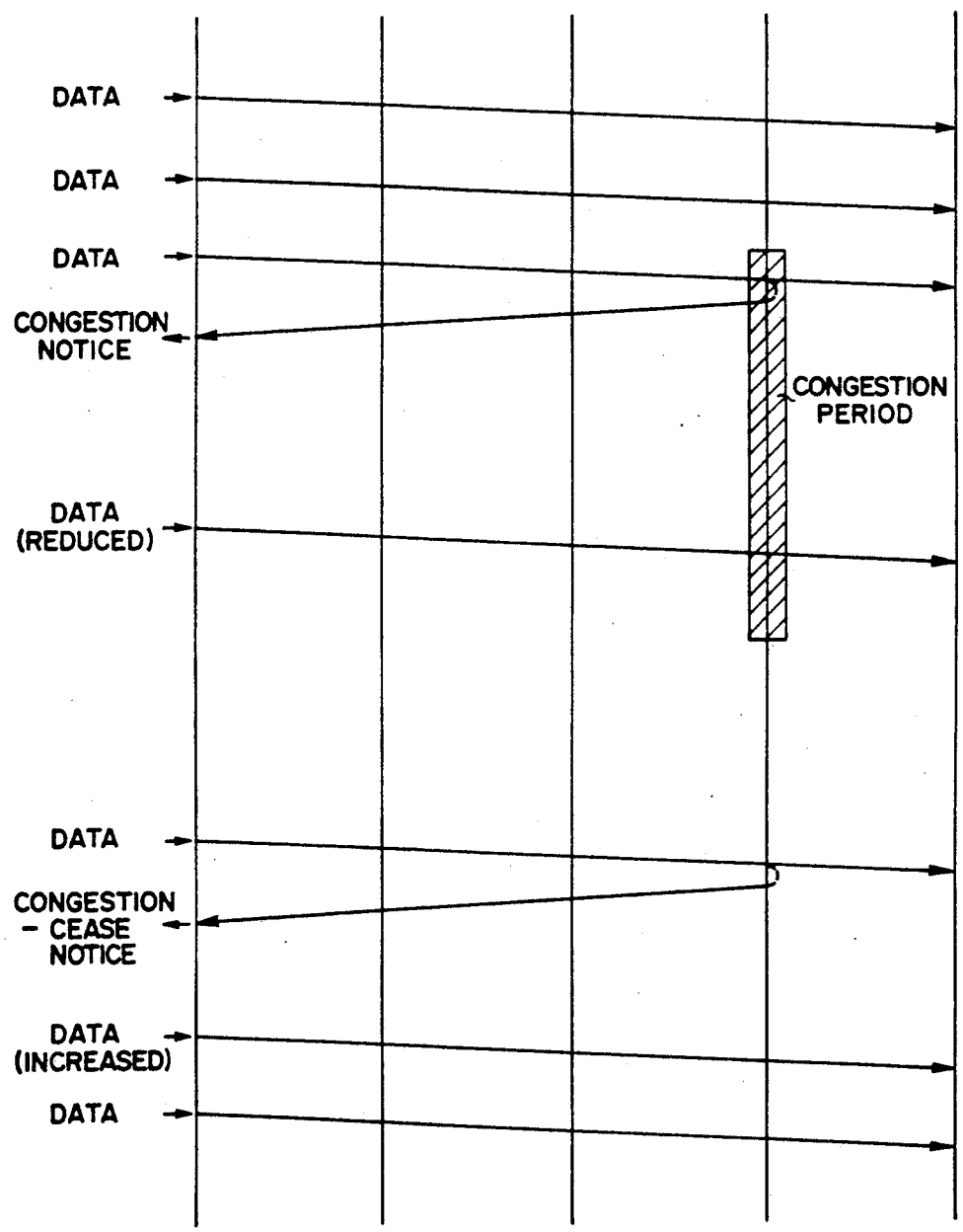

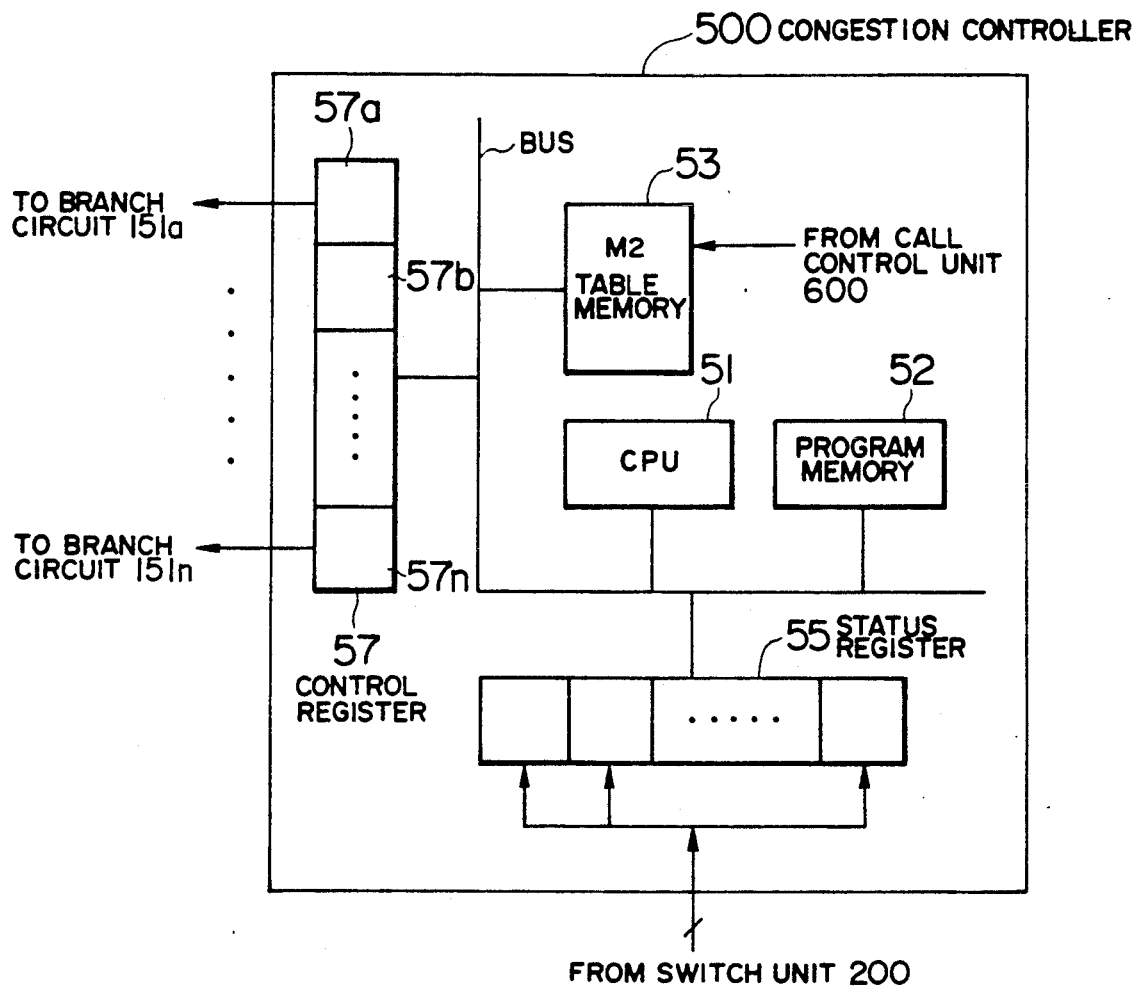

FIG. 24

| ST | TYPE0 | TYPE1 | IN1 | IN2 | | SWITCH INPUT | RETURN PACKET |
|---|---|---|---|---|---|---|---|
| \multicolumn{2}{INPUT} | \multicolumn{3}{OUTPUT} | | | 910 |

| ST | TYPE0 | TYPE1 | IN1 | | IN2 | SWITCH INPUT | RETURN PACKET |
|---|---|---|---|---|---|---|---|
| 0 | 0 | 0 | d | 0 | 1 | ALL PACKETS | NONE |
| 0 | 0 | 1 | d | 0 | 1 | " | " |
| 0 | 1 | 0 | d | 0 | 1 | " | " |
| 0 | 1 | 1 | 1 | 0 | 1 | 1 | " | CONGESTION-CEASE NOTICE |
| 1 | 0 | 0 | 0 | 1 | 1 | 0 | NONE | CONGESTION NOTICE |
| 1 | 0 | 1 | 0 | 1 | 1 | 0 | " | " |
| 1 | 1 | 0 | 0 | 1 | 1 | 0 | " | " |
| 1 | 1 | 1 | 0 | 1 | 1 | 0 | " | " | d: DON'T CARE

PACKET CONGESTION CONTROL METHOD AND PACKET SWITCHING EQUIPMENT

BACKGROUND OF THE INVENTION

1. Field of the Invention

The present invention relates to a packet congestion control method in a packet communication system and to packet switching equipment using the same

2. Description of the Prior Art

In high-speed packet communication, in order to improve the transfer throughput in the network, there has been a tendency to adopt a switch in which the operation of the packet switching equipment is simplified so as to carry out the primary portion of the operation by means of hardware. For example, there has been proposed an asynchronous transfer mode (ATM) as means of effecting a high-speed packet communication in which a fixed-length cell is employed.

In these systems, packets are communicated by use of an information channel for transferring through the network in a transparent fashion information packets to be communicated between packet communication equipment and a control channel for transferring control packets controlling the information channel for call set-up/release, etc.

For a packet transferred through an information channel, the packet switching equipment or the packet switch switches a logical channel number representing an identification of the packet and performs an indispensable minimum processing, such as error detection on the packet. Namely, the packet switch does not conduct processing for an acknowledgment. (A sequence of processing achieved by the packet switch will be referred to as a frame relay here below).

Furthermore, for a control packet to be transferred through a control channel, each packet switching equipment performs a sequence of processing such as a data link setup and a data link release, and processing for a routing operation. In consequence, the transfer rate of a packet on the control channel is less than that developed on the information channel.

Between packet communication equipment (terminals), for example as shown in FIG. 31, packet communication equipment 50a transmits a packet onto a line 91a such that the packet is subjected to a store-and-forward type switching through packet switches 60a to 60c so as to be transferred to packet communication equipment 50b. However, as shown in FIG. 31, since the switches are connected to many lines 91a to 91j, when a large number of packets from plural lines are concentrated on the packet switch 60c, the buffer memory for storing the packets becomes to be insufficient in the packet switch 60c, which can lead to a loss of packets (this event is referred to as a congestion herebelow).

In order to prevent deterioration of quality of packet transfer in a network due to lengthy congestion, when a congestion occurs on an information channel, the occurrence of the congestion is required to be reported to the packet communication equipment to restrict the packet flow rate of packets transmitted onto the information channels.

However, a method to indicate the congestion by use of the control channels takes a considerable period of time for the delivery of the notification to the packet communication equipment and hence is not suitable for the restriction of the flow rate of packets on the information channels.

According to JP-A-63-24742 (Laid-open on Feb. 2, 1988), congestion information is added to an acknowledgment packet on an information channel between packet communication equipment and to a monitoring packet therebetween to identify the congestion to the packet communication equipment, thereby solving this problem.

In the prior art technology above, proper consideration has not been given to the processing load imposed on the packet communication equipment. In consequence, for a communication in which an acknowledgment is not required between packet communication equipment, it is necessary to use a monitoring packet for continuously monitoring congestion, which leads to a problem of increased processing load associated with the transmission of the monitoring packet.

Furthermore, until the packet communication equipment which has received a packet transmits an acknowledgment packet, the congestion cannot be identified to the packet communication equipment operating as the transmission source; in consequence, there has been a problem that a long period of time typically elapses from an occurrence of congestion to when the packet transmission is restricted by the packet communication equipment.

Furthermore, even in a case other than the case of congestion, a packet invalid on an information channel is required to be transferred to process the monitoring packet in the network, which leads to a problem that the effective transfer throughput of the information channel is lowered.

SUMMARY OF THE INVENTION

It is therefore an object of the present invention to respond to congestion in a packet switch by identifying the congestion to the packet communication equipment without using an acknowledgment packet or a monitoring packet.

Another object of the present invention is to instantaneously indicate to packet communication equipments an occurrence of congestion in a packet switch.

In order to achieve the forgoing objects, in accordance with one aspect of the present invention, when it is found that an output line is in a congestion state (namely, the number of packets in a buffer associated with the output line exceeds a threshold value), a packet inputted to a packet switch is sent to the destination equipment; while at the same time congestion information is added to the packet so as to transmit the resultant packet as a congestion notice to the packet communication equipment operating as the transmission source.

In order to instantaneously indicate the congestion to the packet communication equipment without causing a delay due to software processing, in accordance with the present invention, when an input packet is outputted to an output line, another input packet is produced by adding congestion information identifying an occurrence of congestion on the output line to the input packet and the resultant packet is returned from a line interface unit of the output line to the switch unit. The packet undergoes a switching operation in the switch unit so as to be returned as a congestion notice packet to the packet communication equipment operating as the packet source.

In one embodiment of the present invention, a packet inputted to a packet switch during congestion of an output line is returned as a congestion notice to the source packet communication equipment. As a result, packets used in the prior art technology, such as an acknowledgment packet for an addition of congestion information and a congestion monitoring packet, become unnecessary. In consequence, the processing to send these packets is unnecessary also in the packet communication equipment.

Furthermore, according to another aspect of the present invention, using only a return processing and the ordinary switching operations, the congestion notice packet is outputted to the input line. This avoids any need at a time of congestion for software processing to be executed by a control processor. Consequently, the congestion notice packet can be immediately transmitted to the source packet communication equipment.

BRIEF DESCRIPTION OF THE DRAWINGS

FIG. 3 is a diagram schematically showing the principle of a switch unit 200 employed in FIG. 1.

FIG. 4 is a diagram showing a header translation table 213.

FIG. 8 is a diagram showing input/output relationships of a branch circuit controller 150.

FIGS. 11A and 11C are flowcharts of the processing for carrying out an LCN assignment.

FIG. 11B is a diagram showing a routing table.

FIG. 13 is a sequence diagram associated with packet switches and packet communication equipment.

FIG. 20 is a diagram showing the configuration of a congestion control unit 500 in the second embodiment.

FIG. 21 is a diagram showing the configuration of a control table 53.

FIG. 24 is a diagram useful to explain operations of a branch circuit control unit.

DESCRIPTION OF THE PREFERRED EMBODIMENTS

Referring now to FIGS. 1 to 17, a description will be given of the first embodiment of the packet switch according to the present invention.

(1) Overall configuration

Figure 1:
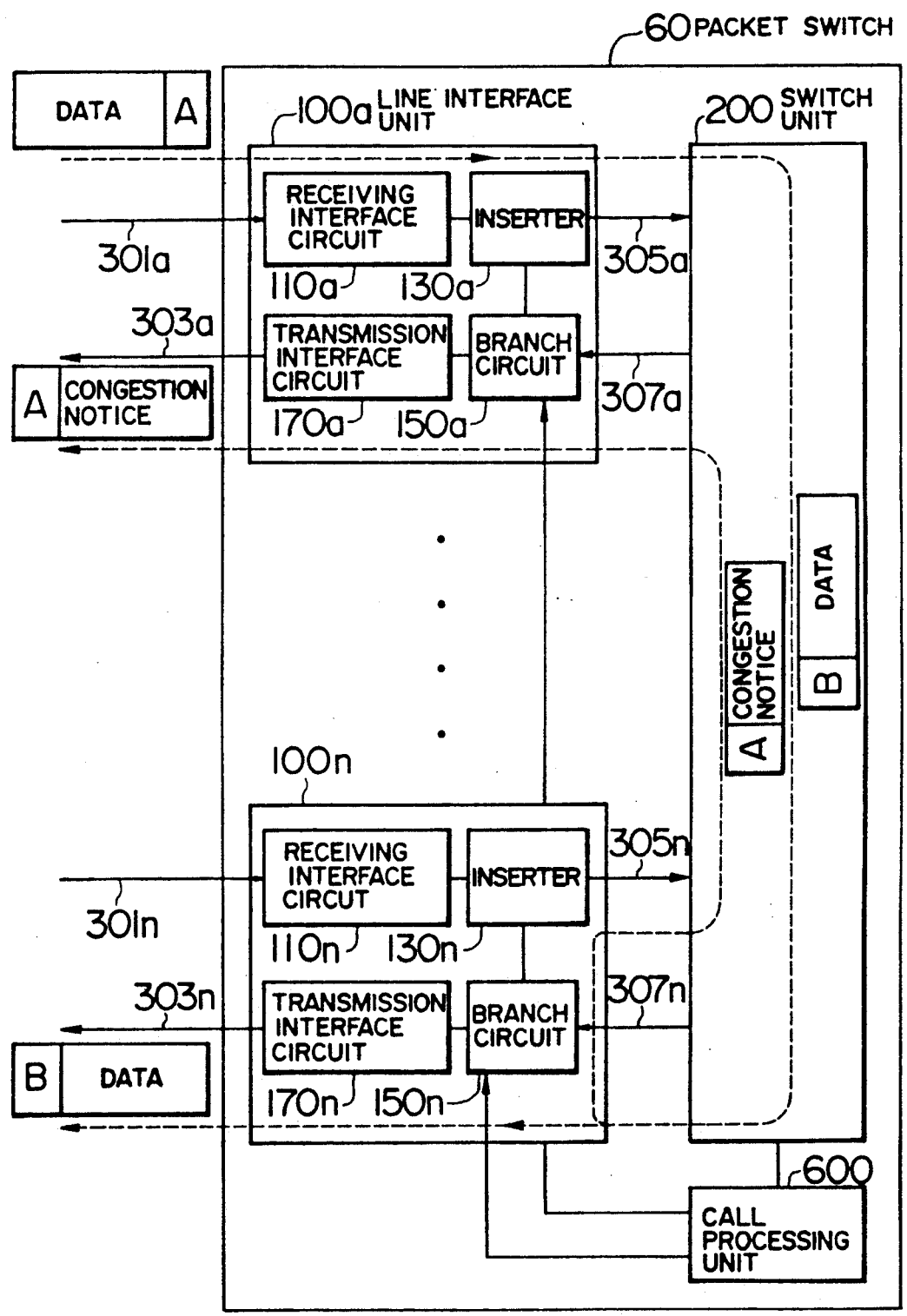
FIG. 1 is a schematic diagram showing a first embodiment of a packet switch according to the present invention.

FIG. 1 is an overall constitution diagram showing an example of a packet switch using a frame-relay transfer method according to the present invention in which a flow of packets in the switch is also represented by use of broken lines. A packet switch 60 includes input lines 301 (301a to 301n), output lines 303 (303a to 303n), line interface units 100 (100a to 100n) connecting the input and output lines to a switch unit 200, the switch unit 200 for switching an input packet to an objective line interface unit, and a call processing unit 600 for achieving call set-up/release, etc. The respective interface units 100 comprise receiving interface circuits 110 (110a to 110n), inserter circuits 130 (130a to 130n) connected between the receiving interface circuits and the switch unit 200, transmission interface circuits 170 (170a to 170n) connected to transmission lines, and branch circuits 150 (150a to 150n) connected between the transmission interface circuits and the switch unit 200. The receiving interface circuit 110 translates a packet format (an external format) of a packet on a line into a packet format (an internal format) effective in a switch, whereas the transmission interface circuit 170 conversely translates the internal format of a packet into the external format.

According to the present invention, when a congestion of packets occurs in a switch with respect to an output line, the switch unit adds congestion indicating information (to be simply referred to as a congestion indicator herebelow) to a packet destined for the congested output line and operates to switch the resultant packet to an objective line interface unit so as to be sent out to the transmission source of the packet. The branch circuit 150 checks, when an input packet from the switch unit 200 is relayed to the transmission interface circuit 170, to determine whether or not a congestion indicator is added to the packet. If a congestion indicator is added thereto, the packet is acquired in concurrence with the output of the packet to the transmission interface circuit 170 and is then translated into a congestion notice packet, which is thereafter sent to the inserter circuit 130. As a result, the congestion notice packet is returned to the switch so as to be outputted to the line interface unit connected to the transmission source of the packet.

The congestion indicator is, as will be described in the following paragraphs, added to a header portion to be used only in the switch and is removed when the packet is passed through the transmission interface circuit. In consequence, the transmission packet sent to the destination equipment does not include the congestion indicator. On receiving a packet including the congestion indicator thus added thereto, the branch circuit 150 produces a congestion notice packet in which an indicator denoting a congestion notice is added to the header portion in the external format constituting the main portion of the packet. Consequently, even when the congestion notice packet is outputted to a line interface unit connected to the transmission source and then the internal header is removed by the transmission interface circuit of the interface unit, the congestion can be reported to the source equipment.

Figure 2A:
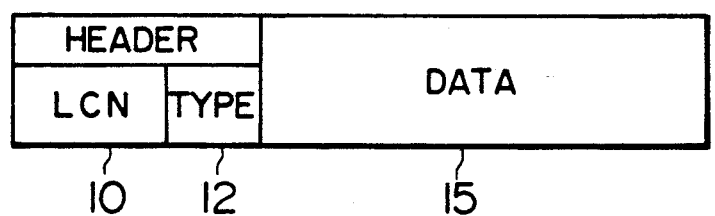
FIGS. 2A and 2B are schematic diagrams showing formats of a packet on a line and in the switch, respectively.
Figure 2B:
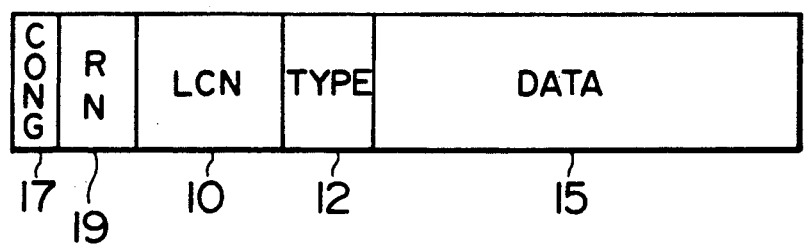

FIGS. 2A and 2B show examples of packet formats to be processed by a packet switch in this embodiment. FIG. 2A is a packet format (an external packet format) on a line in which 10 indicates a logical channel number (LCN) used to perform switch processing for the packet, 12 designates a packet type (TYPE) as necessary minimal information for this embodiment, and a data portion (DATA) 15 is disposed to store therein a detailed packet type such as a call setup packet line in the X.25 protocol. The data (DATA) 15 denotes transmission and/or reception information and control information. FIG. 2B is a packet format (internal format) for the processing in a switch in which a congestion indicator field (CONG) 17 for writing therein a congestion indicator and a route number (RN) 18 are added to the packet of FIG. 2A. TYPE 12 possesses the following meanings.

$$\text{Type} = \begin{cases} 00 \text{ (data packet)} \\ 01 \text{ (congestion notice packet)} \\ 10 \text{ (congestion-cease notice packet)} \\ 11 \text{ (polling packet)} \end{cases}$$

According to the present invention, a feature of the invention resides in the fact that the congestion indicator field (CONG) 17 is disposed in a packet to be processed in a packet switch to represent whether the packet switch is congested (CONG="1") or not (CONG="0").

Next, a description will be given in more detail of the switch unit 200 and the line interface unit 100.

(2) Switch unit 200

FIG. 3 is a diagram showing, as an example of the switch unit 200, the principle of a switch of a memory switch type presented in a paper of the Technical Report SSE88-56 (pp. 37–42) entitled "A Memory Switch Architecture for ATM Switching Network" of the Institute of Electronics, Information and Communication Engineers of Japan in which an inputted packet can be switched at a high speed by use of a frame-relay transfer method. This switch includes a multiplexer (MUX) 211 for multiplexing packets inputted from a plurality of line interface units, a header translation table 213 for translating a logical channel number (LCN) 10 into a new logical channel number, an address filter 215, buffer memories 219 (219a to 219n) for temporarily storing therein packets in association with the respective output lines, an output selector 217 for selecting from the plural buffer memories a packet to be supplied to a demultiplexer (DMUX) 221, and an output counter 218.

This embodiment is characterized in that the buffer memory 219 of the switch unit is provided with a congestion detector 223 for measuring the number of occupied packets in a buffer to detect buffer congestion and with a congestion indicator adding circuit 225 for setting the congestion indicator region(CONG). By the way, the header translation table 213 may be disposed in each line interface unit 110 to translate the logical channel number for each line, rather than being in the switch unit 200. Furthermore, the adding circuit 225 may be disposed before the buffer 219 associated with an output line.

FIG. 4 shows the constitution of the header translation table 213 in the switch unit 200. In association with a logical channel number (LCN) of a packet inputted to a packet switch, there is stored an output LCN of the packet. Incidentally, of the input LCNs, numbers 0 to n are associated with an area 213A allocated to control channels and the other numbers are associated with an area 213B allocated to user information channels.

Next, with reference to FIG. 5, a description will be given of an example of the configuration of the switch unit 200 constructed and the principle of operation of the switch. In this figure, the same reference numerals as those of FIG. 3 denote the same components as those of FIG. 3.

A main buffer 261 is a buffer memory for temporarily storing therein a packet and corresponds to the buffers 219a to 219n associated with the output lines of FIG. 3. An address pointer 257 controls an address of the main buffer 261 in association with output lines. An idle address FIFO 255 is an FIFO for producing therein a queue of unused addresses of the main buffer 261. The idle address FIFO 255 and the address pointer 257 perform functions which correspond to functions of the address filter 215 and the output selector 217 of FIG. 3.

The address pointer 257 receives as inputs thereto an address (NWAD) to be used to write the next packet in the main buffer 261 and an address (NRAD) to be employed to read the next packet from the main buffer 261, namely, at an arrival of a packet, a write address (WA) is set to the main buffer 261 and when a packet is to be outputted to an output line, a read address is set thereto. By the way, the function of the congestion detector 223 is included in the address pointer 257, and the output of the congestion detection signal (CONG) is set to H at the time of buffer congestion.

The idle address FIFO 255 receives as inputs thereto addresses not used to accumulate packets in the main buffer to generate a queue thereof, namely, an address (NWAD) for the next read operation is connected to the address pointer 257 and the main buffer such that the NWAD is also written when a packet is written in the main buffer 261. With this provision, when a packet is read, it is possible to specify an address to read the next packet.

A selector 262 and an unused address register 263 are used to set the read register RA to a value indicated by the unused address register 263 when there does not exist any packet to be outputed to an output line, namely, when a buffer empty signal (E) from the address pointer is H.

The AND gate 254 outputs a write enable signal (WE) to the main buffer 261, a write address enable signal (WANE) to the address pointer 257, and a read clock to the idle address FIFO 255. The outputs are set to H at a header conversion of a packet.

A counter 259 is equivalent to the output counter 218 of FIG. 3 and supplies the address pointer 257 with a read sequence number (RACNT) employed to read a packet from the main buffer 261.

Figure 6:
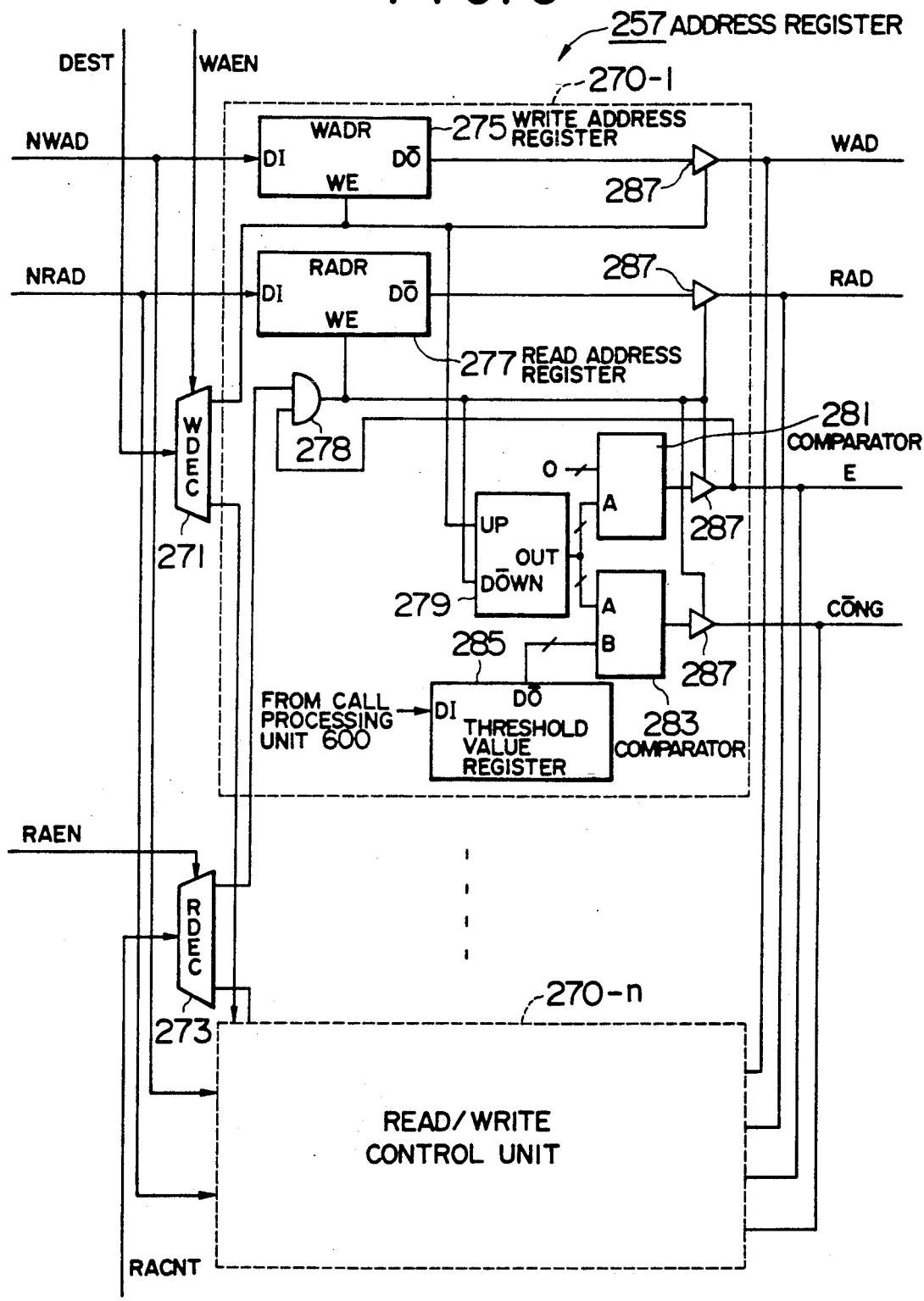
FIG. 6 is a schematic diagram showing the configuration of the address pointer 257 of FIG. 5.

Next, referring to FIG. 6, a description will be given of details about the address pointer 257.

A write decoder (WDEC) 271 receives as an input an output line number (DEST) delivered from the header conversion table to select an output line when the write address enable signal (WAEN) is H so as to output a control signal to a read/write control unit 270 corresponding to the output line. A read decoder (RDEC) 273 outputs a control signal to a read/write control unit 270 corresponding to an output line to read a packet from the main buffer 261. A write address register 275 outputs an address to write a packet in a buffer corresponding to the output line. Moreover, the read address register 277 outputs an address to read a packet from the main buffer 261 so as to output the packet to the output line. A counter 279 counts the number of packets in the buffer to increment the value by one when a packet is written and to decrement the value by one when a packet is read. A comparator 281 compares the value of the counter 279 with "0" to set the output to a high level H when these values are equal to each other. A comparator 283 compares the value of a threshold register 285 with that of the counter 279 to set the output to H when the counter contains the larger value. Incidentally, the threshold value register 285 may be set to a fixed value in any cases or may be appropriately rewritten by the call processing unit.

As a result, when a buffer corresponding to the output line is empty, the output of the buffer empty signal (E) is set to H, whereas when the buffer is congested, the congestion signal (CONG) is set to H, so that when a packet is outputted from the buffer memory 261, the congestion indicator region can be set to "1". By the way, 287 indicates a 3-state buffer, which is set to on when a circuit associated with an output line is selected by WDEC or RDEC.

As described above, since the switch unit is constituted entirely of hardware circuits, the packet switch processing and the buffer congestion detection can be accomplished at a high speed.

(3) Line interface unit 100

The receiving interface circuit 110 included in each line interface unit 100 of FIG. 1 performs an optical/electric signal conversion and parallel-to-serial signal conversion. When a congestion notice packet is inputted from the branch circuit 150, in order to prevent a collision between packets inputted from the receiving interface circuit 110 and the branch circuit 150, the inserter circuit 130 temporarily saves the packet inputted from the receiving interface circuit 110. However, in order to prevent the queue from becoming too great due to inputs from the receiving interface circuit 110 and the branch circuit 150, the transfer rate of the data input line 305 is set to be higher than that of the input line 301. The transmission interface circuit 170 achieves a conversion in a reverse direction as compared with the conversion of the receiving interface circuit 110 so as to output a packet having an external format to a line. The branch circuit 150 is responsive to the congestion indicator represented in the congestion indicating region(CONG) 17 of a packet to produce a congestion control packet by rewriting a portion of the received packet so as to transfer the resultant packet to the inserter circuit 130.

Figure 7:
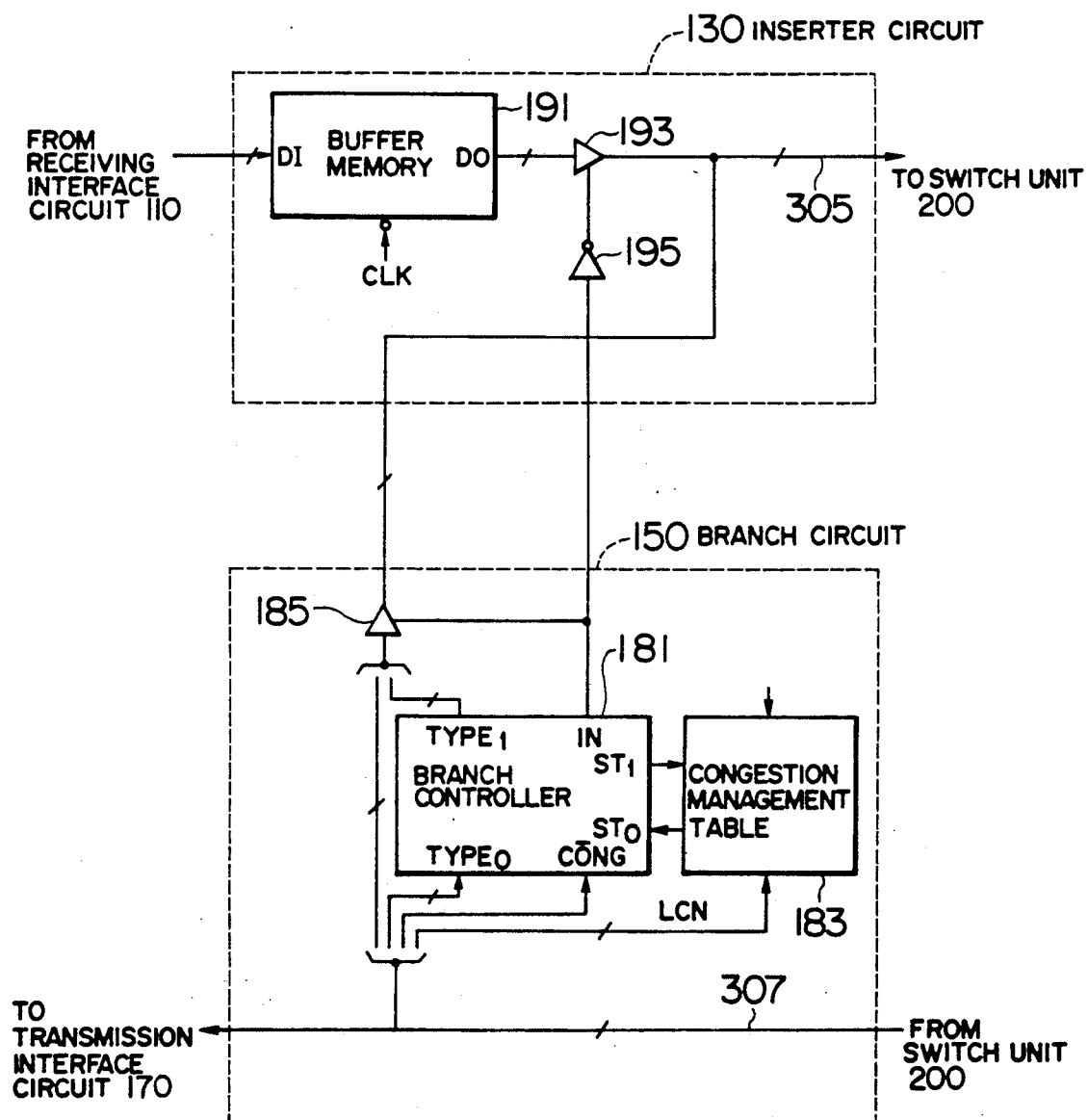
FIG. 7 is a schematic diagram showing an example of an inserter circuit 130 and a branch circuit 150.

FIG. 7 shows a detailed constitution of the inserter circuit 130 and the branch circuit 150 in the line interface unit 110.

The branch circuit 150 comprises a congestion management table 183 for keeping a congestion state for each logical channel number and a branch controller 181 for outputting a signal (TYPE1) denoting a new packet type to be set as a type of a congestion control packet and an enable signal (IN) instructing the inserter circuit to insert the congestion control packet.

Figure 23:
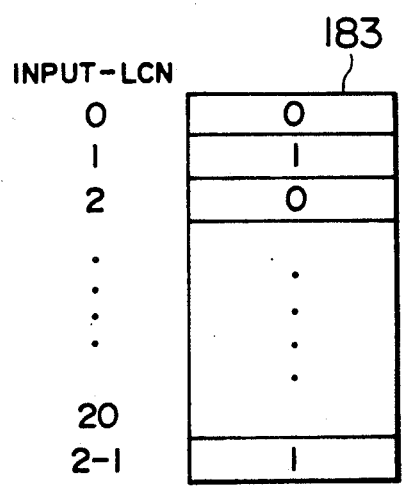
FIG. 23 is a diagram of a congestion table 183 (and 41).

The congestion table 183 is disposed to store therein, as shown in FIG. 23, a congestion state (=1) or a non-congestion state (=0) for each LCN.

The branch circuit 150 produces, in response to a combination of a congestion state $ST_0$ read out from the congestion table 183 in association with the LCN 10 of the received packet, a congestion indicator region (CONG) 17 of the received packet, and a type ($TYPE_0$) 12, a congestion state write signal $ST_1$, a new packet type signal $TYPE_1$, and an enable signal IN as shown in a table 900 of FIG. 8. With this provision, when the normal state ($ST_0=0$) is changed to the congestion state (CONG=1) or when the congestion state ($ST_0=1$) is changed to the non-congestion state (CONG=0), it is possible to transfer to the inserter circuit 130 a congestion control packet including congestion notice information(TYPE=01) or congestion cease information(TYPE=10). By the way, the congestion table 183 is established and released by the call processing unit 600 when a call is set up and when a call is released, respectively.

The inserter 130 includes a buffer memory 191 for temporarily storing therein a packet supplied from the receiving interface circuit and a 3-state gate 193. The 3-state gate is turned on and off by the insertion signal (IN) from the branch circuit 150.

By configuring the line interface unit as described above, in response to the congestion indicator denoted by the congestion indicating region(CONG) of a packet outputted from the switch unit, it is possible to change the packet type to a congestion notice/cease notice packet at a high speed and to re-input the packet to the switch unit.

Next, a description will be given of the operation of the packet switch.

(4) Operation outline

A sequence of operations of a plurality of packet switches 60 to achieve switching of a packet sent from a packet communication equipment 50 will be here described in two stages including the call processing for a logical channel (LCN) assignment and the congestion notice/cease processing.

The call processing for an LCN assignment denotes processing in the switch unit to determine an LCN in a header of a packet for switch processing, namely, the switch unit accomplishes switch processing based on the LCN and the packet has assigned thereto a new LCN so as to be outputted to an objective line.

If the congestion state of a buffer associated with a particular output line is changed, as shown in FIG. 1, the line interface unit of the output line outputs a packet and at the same time transmits as a return message a congestion notice packet or congestion cease packet. In this embodiment, the feature of the invention resides in the fact that the line interface unit rewrites a portion of the packet thus inputted to return the resultant packet as a congestion notice/cease packet to the packet communication equipment operating as the transmission source.

Next, the operation will be described further in detail.

(5) Call processing (LCN assignment)

Figure 9:
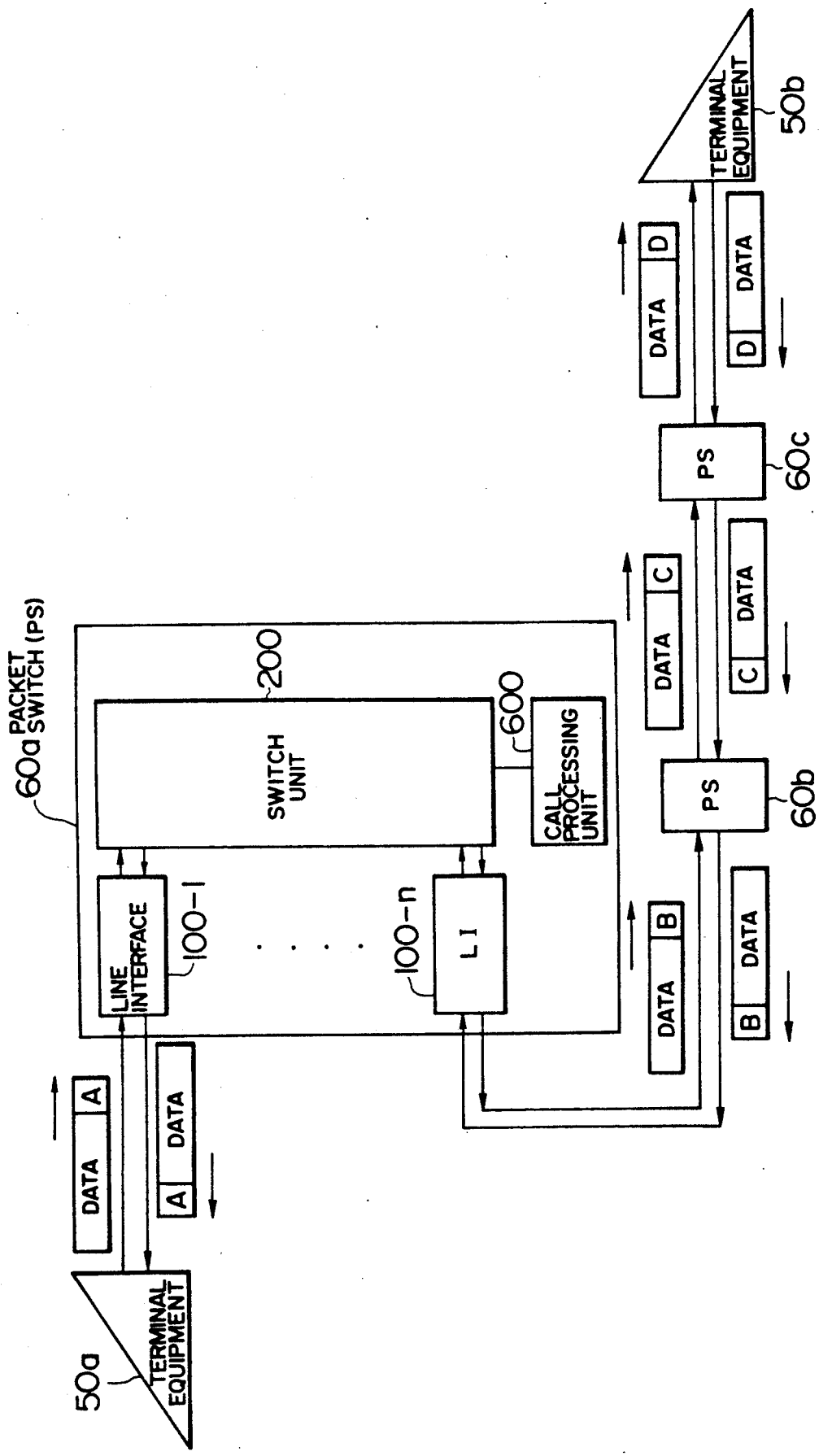
FIG. 9 is a diagram for explaining packet communication in a system including a plurality of switches.

For example, as shown in FIG. 9, in a case where two terminals 50a and 50b communicate with each other via a plurality of packet switches 60a to 60c, each packet switch identifies a packet based on a logical channel number (LCN) in the header of the received packet so as to accomplish packet switch processing. Each packet has assigned thereto a new LCN when the packet is outputted to an objective output line. In consequence, when packet communication is started, the LCN is to be assigned in advance A description will next be given of an example of the call processing to assign the LCN. By the way, in this embodiment, when a control packet is transmitted on a control channel, LCN =0 is assumed in any case.

Next, a description will be given of LCN assign processing when the packet communication equipment 50a shown in FIG. 9 transmits a packet via the packet switches 60a, 60b, and 60c to the destination equipment 50b.

Prior to initiating a packet communication on an information channel, the packet communication equipment 50a transmits an LCN assign request packet to the packet switch 60a via a control channel (i.e. LCN=0). On receiving the packet with LCN=0, the packet switch 60a sets the output line number of the received packet to 0 based on the header conversion table shown in FIG. 4 and then transfers the packet to the call processing unit 600 in a similar fashion to that of a transfer to the line interface unit 100.

Figure 10:
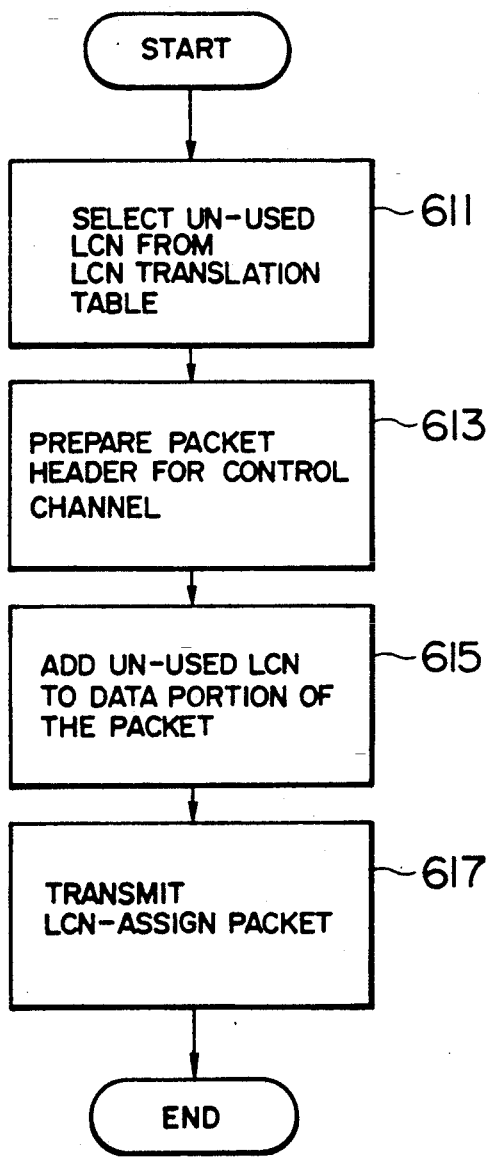
FIG. 10 is a flowchart of the processing performed when an LCN request packet is received.

Referring to the flowchart of FIG. 10, a description will be given of processing to produce an LCN assign packet to be achieved by the call processing unit 600 which has received an LCN assign request packet.

The call processing unit 600 first selects an unused LCN for which an output LCN is "0" from the LCNs of the information channel region 213 in the header conversion table 213 shown in FIG. 4 (step 611). Subsequently, based on a route number (RN) of the received packet, the processing unit 600 generates a header of a packet for an LCN assignment having an LCN of the control channel shown in FIG. 4 unique to the pertinent output line (step 613), adds an unused LCN selected in the step 611 to the data portion of the packet (step 615), sends the LCN assign packet to the packet communication equipment 50a requesting the LCN, and inputs the packet to the switch unit 200 (step 617).

The packet communication equipment 50a having received the notice packet including the assigned LCN thereafter can transfer to an information channel the packet with a header including the assigned LCN. At this point of time, an LCN has not been assigned for transfer of the packet between the packet switches 60a, 60b, and 60c and the packet communication equipment 50b. Processing for that assignment will next be described.

On receiving the LCN assign packet, the packet communication equipment 50a transmits a call set-up packet onto a control channel (i.e. LCN=0). To the data portion of this packet, there are added identification information of the packet communication equipment 50a and identification information of the packet communication equipment 50b. Information for identifying a packet communication equipment is, for example, a dial number in a line switching system.

The call processing unit 600 of the packet switch 60a having received the call setup packet transmits the LCN request packet to the packet switch 60b. This processing will be described with reference to FIGS. 11A to 11C.

The call processing unit 600 references the routing table (FIG. 1B) based on identification information included in the received packet from the packet communication equipment 50a to denote the destination packet communication equipment 50b to recognize an output line number connected to the packet switch 60b for which a new logical channel is to be established (step 619). Thereafter, as in the operation of the packet communication equipment 50a, an LCN assign request packet with LCN=0 is transmitted onto an output line destined to the packet switch 60b (step 621).

Subsequently, the packet switch 60b returns an LCN assign packet to the packet switch 60a. Processing to be achieved by the packet switch 60a having received the packet is shown in the flowchart of FIG. 11C. The packet switch 60a references the header conversion table 213 such that if the LCN assigned by the received LCN assign packet is unused (step 623), the LCN indicated to the packet switch 60a is set as an output LCN corresponding to an input assigned to the packet communication equipment 50a (step 627). Next, a call setup packet is transmitted to the packet communication equipment 60a to clear the pertinent information of the congestion table 31 of the line interface unit 100 (step 629). If the LCN indicated to the packet switch 60a is being used, an LCN assign request is again issued to the switch 60b (step 625).

Figure 12:
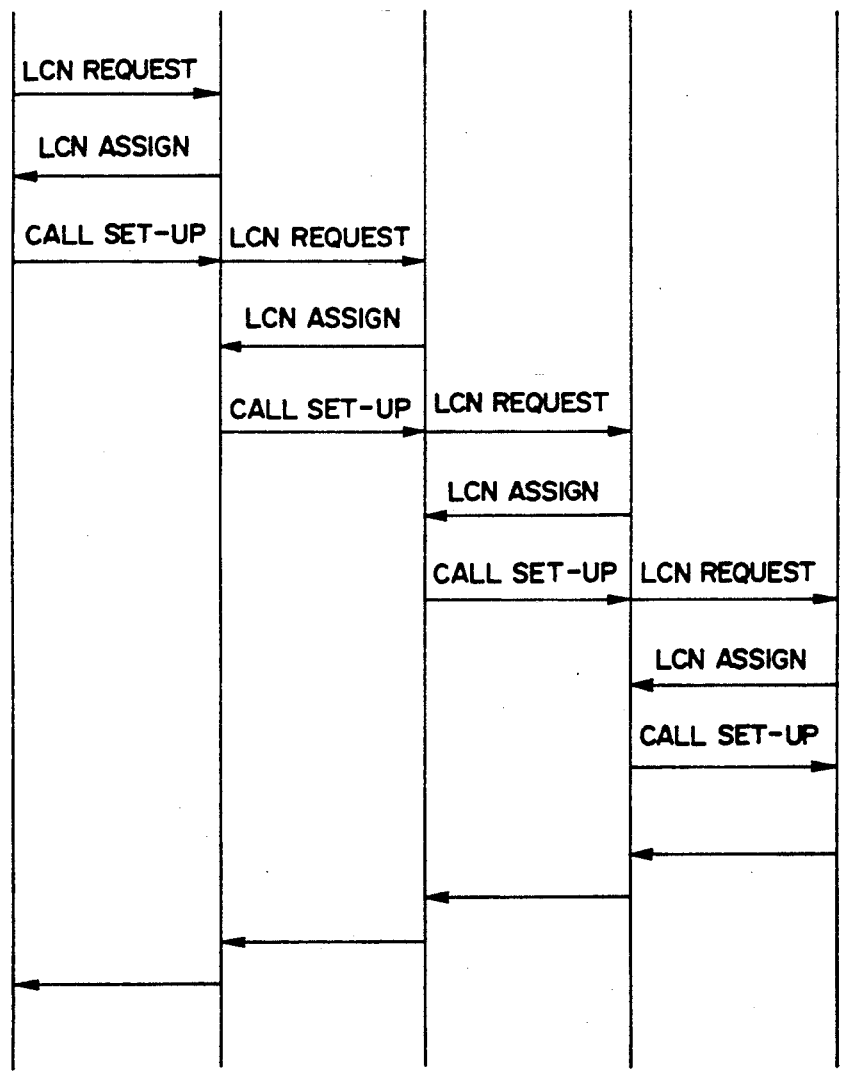
FIG. 12 is a diagram for explaining an operation sequence associated with packet switches and terminal equipment at an LCN assignment.

Similarly, as shown in FIG. 12, the LCN undergoes assign processing between the packet switches 60b and 60c and the packet communication equipment 50b, thereby assigning the LCN on all information channels between the packet switch 50a and the packet switch 50b.

Next, a description will be given of processing in which the packet communication equipment 50a transfers a packet through an information channel by use of the LCN thus assigned so as to achieve switch processing of the packet through the packet switches 60a, 60b, and 60c.

(6) Switch processing

After being assigned a logical channel number (LCN), the packet switch 60 conducts switch processing on an input packet as will be described below to output a resultant packet to an objective output line.

A packet (assume LCN=A) inputted from the packet terminal equipment via the input line 301a into the packet switch 60 is supplied via the line interface unit 100a to the switch unit 200 as shown in FIG. 1.

Figure 5:
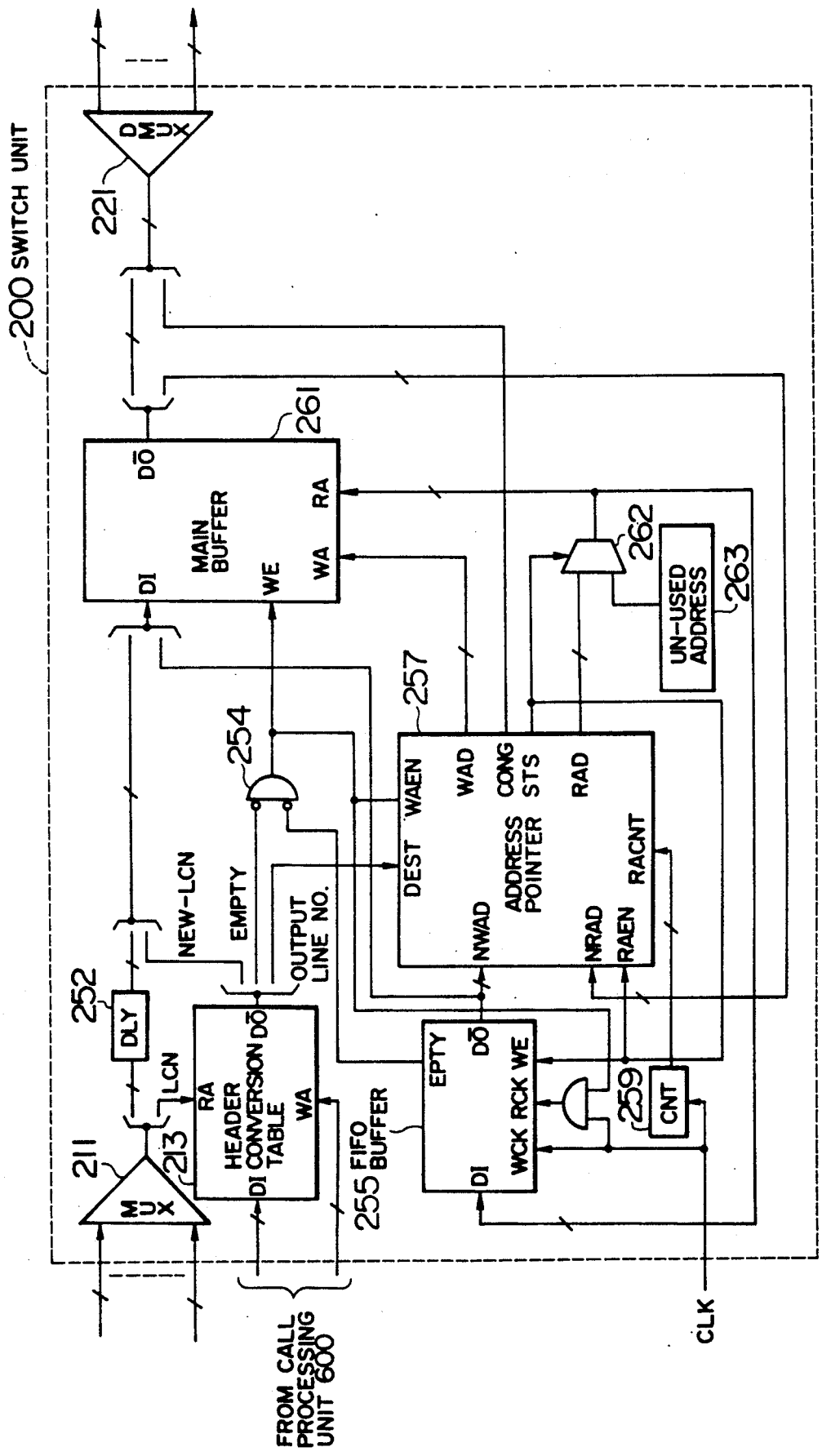
FIG. 5 is a schematic block diagram of the switch unit 200.

As indicated in FIG. 5, the header of the packet inputted to the switch unit 200 is fed to the header conversion table 213 in which by referencing the table shown in FIG. 4, a conversion is achieved to obtain a new logical number (LCN) (LCN=A→LCN=B). At this point of time, the header conversion table 213 outputs an output line number (DEST) corresponding to an output line to which the packet is to be delivered. Based on the DEST, the address pointer 257 outputs a write address (WAD) of the main buffer 261, thereby writing the input packet in the main buffer. On the other hand, based on the read address (RAD) read from the address pointer 257, a packet stored in the main buffer is read out therefrom.

The operation of the address pointer 257 will be described in detail with reference to the circuit diagram of FIG. 6.

The DEST outputted from the header conversion table 213 is inputted to a write decoder WDEC 271 of the address pointer 257. The WDEC 271 sends a write enable signal (WE) to the write address register 275 of the read/write control unit 270-$i$ corresponding to the output line number (DEST). The register 275 is responsive to the input of WE to fetch a main buffer write address (NWAD) from the idle address FIFO 255 so as to output the write address as a write address WAD to the main buffer 261. By the way, in this situation, the value of the counter 279 for measuring the number of packets in the buffer is incremented by one.

When outputting a packet written in the main buffer 261 is outputted to an objective line, the read decoder 273 sends a write enable signal (WE) to the read address register (RADR) 277 of a read/write control unit 270-$i$ corresponding to the output line to which the next packet is to be delivered. The RADR 277 is responsive to the WE signal to acquire the next read address NADR to send this address as RAD. As a result, a packet is read from the main buffer 261 beginning from the address RAD and then the value of the counter 279 is decremented by one.

The packet thus read out is sent through the demultiplexer 221 to the line interface unit 100$n$ for the output operation so as to be fed to the objective output line 303$n$.

(7) Congestion notice/cease processing

Next, by use of the sequence diagram shown in FIG. 13, a description will be given of processing to be conducted by the packet switch at a time of packet congestion.

Let us now assume that a congestion takes place in the packet switch 60$c$ when the packet communication equipment 50$a$ is transmitting a data packet destined to the packet communication equipment 50$b$. The packet switch 60$c$ transfers at an occurrence of the congestion, a packet from the packet communication equipment 50$a$ to the packet communication equipment 50$b$ and sends further a congestion notice packet to the packet communication equipment 50$a$. The packet communication equipment 50$a$ having received the congestion notice packet reduces the packet flow rate to accomplish the packet transmit operation. If a congestion cease notice packet is received subsequently from the packet switch 60$c$, the packet communication equipment 50$a$ continues the packet transmit operation at an increased packet flow rate.

Subsequently, a description will be given slightly in more detail of an operation in which the packet switch 60$c$ sends a congestion notice packet (TYPE =01) to the packet communication equipment 50 as a transmission source.

A data packet of FIG. 2A (e.g. LCN-A, TYPE=00) inputted from the input line 301$a$ is supplied via the receiving interface circuit 110$a$ and the inserter circuit 130$a$ to the switch unit 200. In the switch unit 200, the logical channel number (LCN) in the header is converted as A→B so as to accomplish the switch processing as described above.

In the switch processing, as described above, the counter 279 shown in FIG. 6 is measuring the number of packets for each output line stored in the main buffer 261. The value of the counter 279 is compared, at an output of a packet to an output line, with a predetermined threshold value set in the threshold value register 285 by use of a comparator 283. If the number of packets in the buffer exceeds the threshold value, the output of the congestion signal (CONG) becomes to be H so as to set "1" to the congestion indicating field (CONG) included in the packet shown in FIG. 2B. By the way, the threshold value set to the register 285 may be assigned by the call processing unit 600 with a fixed value selected in association with the capacity of the main buffer 261 or may be varied when necessary.

The packet for which CONG is set to "1" is transmitted by the demultiplexer 221 to the line interface unit 100$n$ for the output operation.

The branch circuit 150$n$ of the line interface unit sends a data packet from the switch unit 200 to the transmission interface circuit 170$n$; furthermore, the packet is copied to produce a packet containing the same content so as to change the packet type TYPE$_0$ thereof to a congestion notice packet code (TYPE=0) denoting TYPE$_1$ of the output table of FIG. 8, thereby sending the packet to the inserter circuit 130$n$. The congestion notice packet sent to the inserter circuit 130$n$ is inputted to the switch unit 200 again to undergo a switch processing such that the logical channel number (LCN) is restored as B→A by the header conversion table and then the packet is returned to the line interface unit 100$a$ corresponding to the transmission source of the packet.

The line interface unit 100$a$ outputs the congestion notice packet via the branch circuit 150$a$ and the transmission interface circuit 170$a$ to the line 303$a$, thereby delivering the congestion notice packet to the packet communication equipment 50$a$ of the transmission source. Incidentally, when a congestion notice packet or a congestion cease notice packet having TYPE=01 or 10 is received from the switch unit 200, the branch circuit 150$a$ does not achieve (don't care) the return processing according to the output table of FIG. 8.

As described above, according to the embodiment, in order to conduct a congestion control, one packet undergoes the switch processing twice such that in the second switch processing, the logical channel number (LCN) of the packet is restored to the original logical channel number (LCN=A), thereby identifying the congestion to the packet communication equipment operating as the transmission source. Furthermore, in a case where a congestion notice packet has already been transmitted and where the congestion state has been continued, it is possible to avoid an operation to transmit again the congestion notice packet By the way, for a transmission of the congestion control packet (the congestion notice or congestion cease notice) to the packet communication equipment operating as the transmission source, the congestion control packet may be assigned a logical channel number different from the one assigned to the input packet. In accordance with the method of the present invention, it is not necessary to employ a packet for acknowledgment or a congestion monitoring packet in a continuous fashion as in the conventional system.

In consequence, in addition to a decrease of the load on the packet communication equipment, the transfer throughput in the packet network is increased. Moreover, since it is only necessary to dispose an inserter circuit 130 of a simple branch circuit 150 in each line interface unit 100, the congestion can be rapidly identified to the packet communication equipment.

Next, a description will be given of processing to be achieved when the packet communication equipment 50 of the embodiment receives a congestion control packet.

Figure 14:
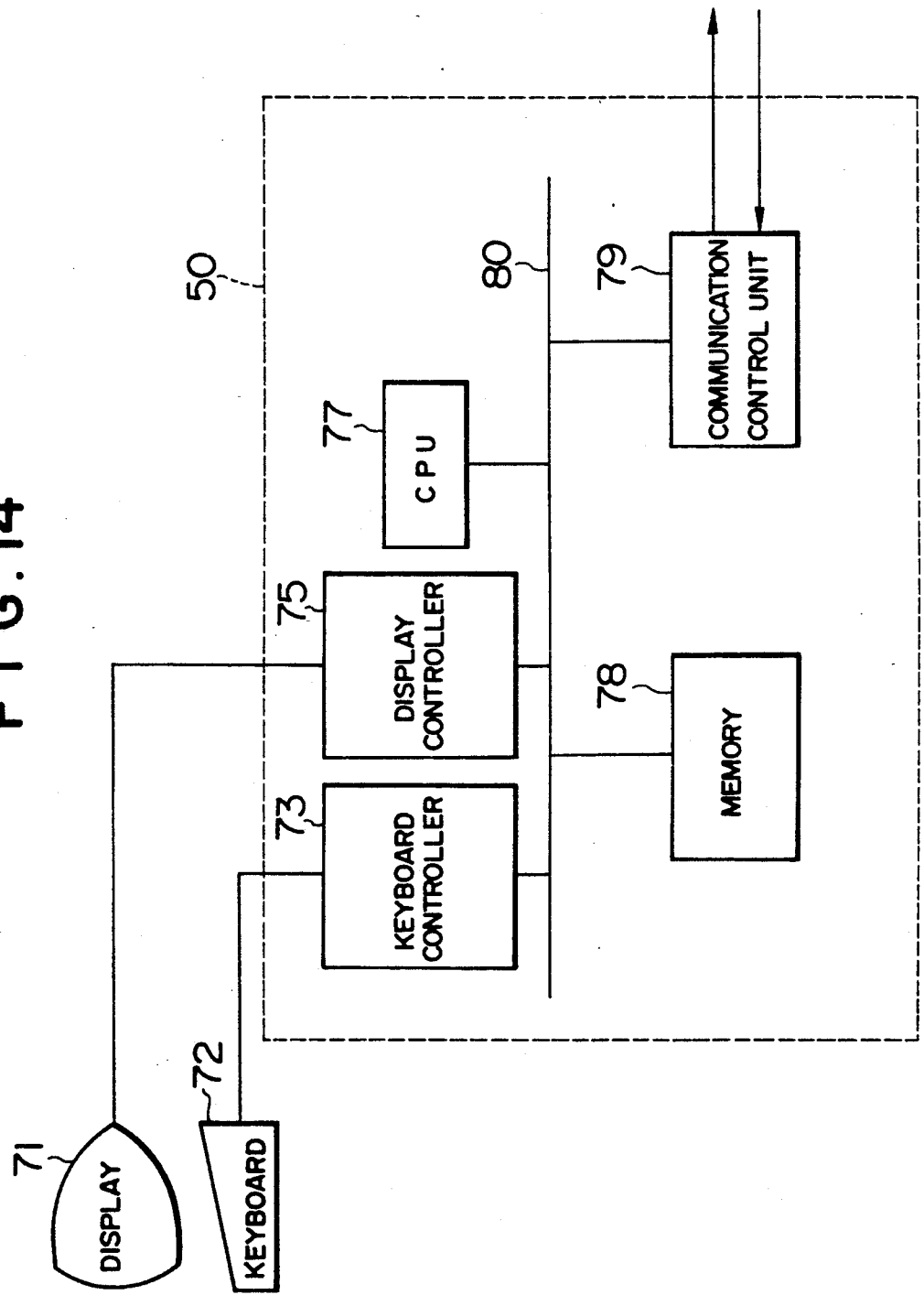
FIG. 14 is schematic block diagram of a packet communication equipment.

FIG. 14 shows an example of the constitution of the packet communication equipment 50 in this embodiment. A memory 78 is used to store therein a communication program and data for transmission and reception. A CPU 77 transfers data of the memory 78 to a communication control unit 79 and stores data received by the communication control unit 79 in the memory 78. A keyboard controller 73 stores data inputted from a keyboard 72 in the memory 78 and a display controller 75 displays on a display 71 received data and control information.

Figure 15:
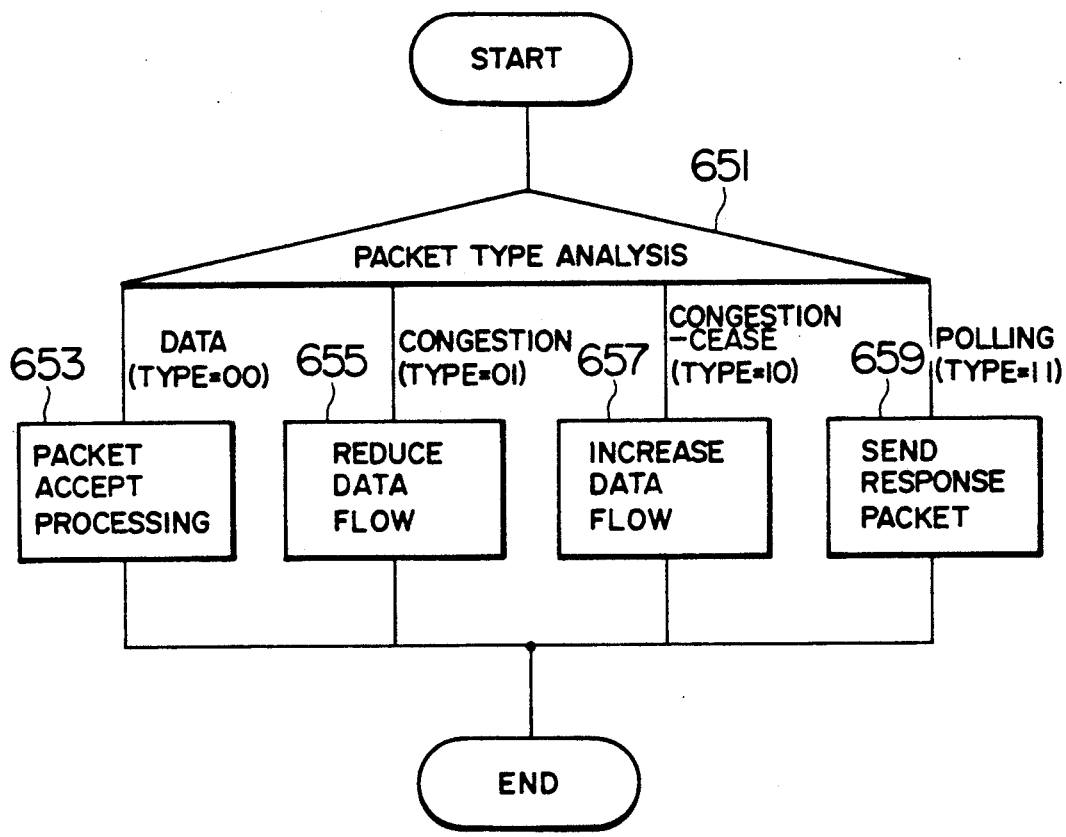
FIG. 15 is a flowchart showing an outline of processing carried out when a packet is received in a packet communication equipment.

The communication control unit 79 achieves processing shown in FIG. 15 when a packet shown in FIG. 2A is received.

The communication control unit 79 analyzes content of the packet type (TYPE) field 12 of the received packet (step 651) to execute the following processing based on the packet type.
Case of TYPE=00 (data packet)
Packet receive processing is conducted (step 653).
Case of TYPE=01 (congestion notice packet)
The packet flow rate is reduced (step 655).
Case of TYPE=10 (congestion cease notice packet)
The packet flow rate is increased (step 657).
Case of TYPE=11 (polling packet)
A response packet is transmitted (step 659).

Figure 16:
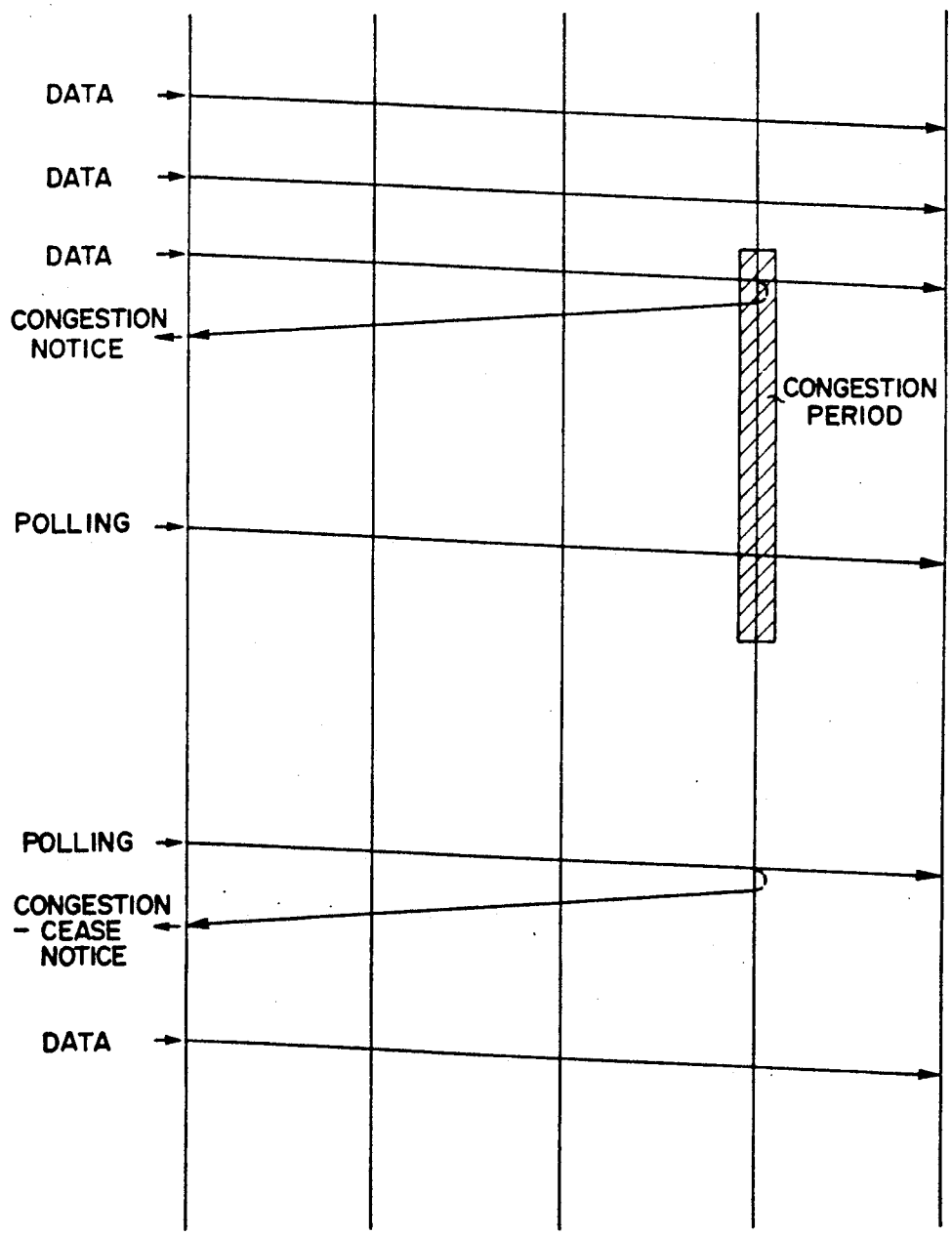
FIG. 16 is a diagram showing a variation of an operation sequence associated with packet switches and packet communication equipment in the first embodiment.

The processing here to reduce the packet flow rate indicates in a case of a window control an operation to lower a window size to a fixed value, whereas the processing to increase the packet flow rate denotes an operation to gradually increase the window size. In addition, e.g. as shown in FIG. 16, after a packet communication equipment receives a congestion notice packet, packet transmission may be stopped such that thereafter a polling packet is transmitted at a constant interval of time and, if the congestion is already resolved, a switch responds to the polling packet to transmit a congestion cease notice packet, thereby resulting in decrease of the packet flow rate. By the way, the communication control unit 79 of the packet communication equipment may display on the display the state of congestion via the memory 78.

Next, a description will be given of operations in which, when the packet switch 60 of this embodiment releases the congestion, a congestion cease notice packet is sent to the packet communication equipment 50 operating as the transmission source.

When a packet transmitted from the packet communication equipment 50 undergoes a switch processing in the switch unit 200 as described above, if the number of packets already inputted to the packet switch is lowered and the congestion is resolved, the count value from counter 279 is less than the threshold value and the congestion signal (CONG) becomes L. In consequence, the switch unit 200 transfers to the line interface unit 100n a packet of which the congestion indicating field (CONG) is "0".

The branch circuit 150 of the line interface unit 100n on the output side transfers, when the congestion indicating field (CONG) of the inputted packet is "0" and the congestion management table 183 indicates a congestion state ($ST_0=1$), to the inserter circuit 130 a congestion control packet in which the packet type (TYPE) 12 of the received packet is changed to a congestion cease state (TYPE=10). In this situation, a value "0" is written by a signal $ST_1$ in the congestion management table 183 at an address corresponding to the received packet LCN. The congestion cease notice packet inputted to the inserter circuit 130 is, like the congestion notice packet described above, again subjected to the switch processing so as to be transmitted to the packet communication equipment 50 operating as the transmission source.

As described above, the packet sent from the packet communication equipment is returned as a congestion cease notice packet in the line interface unit, thereby rapidly identifying the congestion cease condition to the packet communication equipment operating as the transmission source. At the occurrence of congestion, the packet type may be directly rewritten in the switch so as to return the rewritten packet in the branch circuit 150, thereby transmitting the packet to the packet communication equipment operating as the transmission source.

Figure 17:
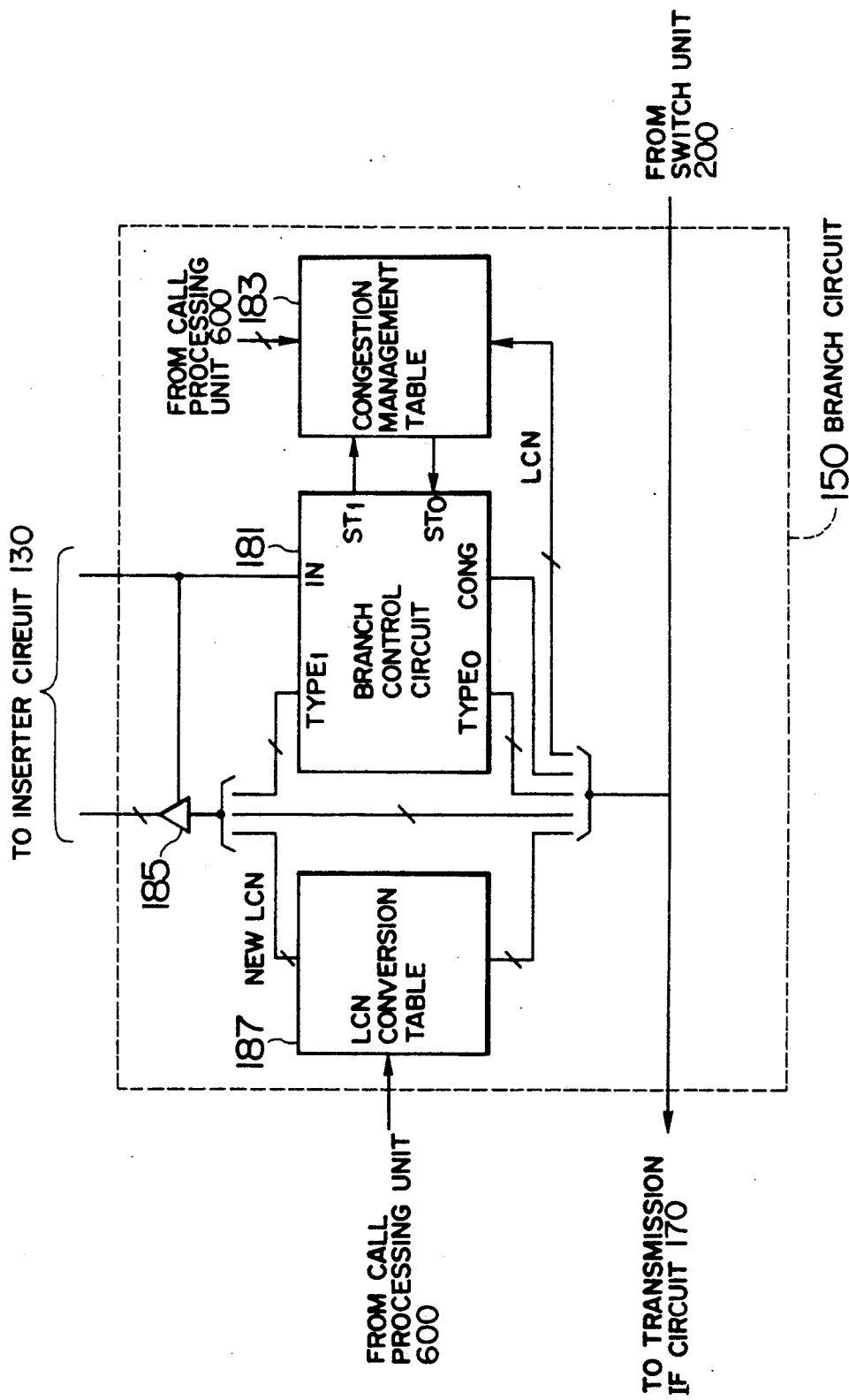
FIG. 17 is a circuit diagram showing an alternative embodiment of the branch circuit of FIG. 1.

Incidentally, when a combination of logical channel numbers (e.g. A→B) related to the direction of the packet transmission is different from a combination of logical channel numbers (e.g. C→G) associated with the direction of the transmission of the congestion notice/cease notice packet, the congestion control packet cannot be delivered to the packet communication equipment operating as the transmission source only by returning the received packet. In such a case, e.g. as shown in FIG. 17, it is only necessary to dispose an LCN conversion table 187 in the branch circuit 150 such that the LCN of the congestion control packet is altered as (B→C) so as to return the packet to the switch unit 200. As an alternative variation, in place of the congestion control packet having the CONG field above, a packet may be produced in the branch circuit 150 by adding control information denoting a generation or a removal of the congestion to the data portion of the received packet so as to return the packet to the packet communication equipment.

Next, referring to the drawings, a description will be given of the second embodiment according to the present invention.

(1) Overall configuration

Figure 18:
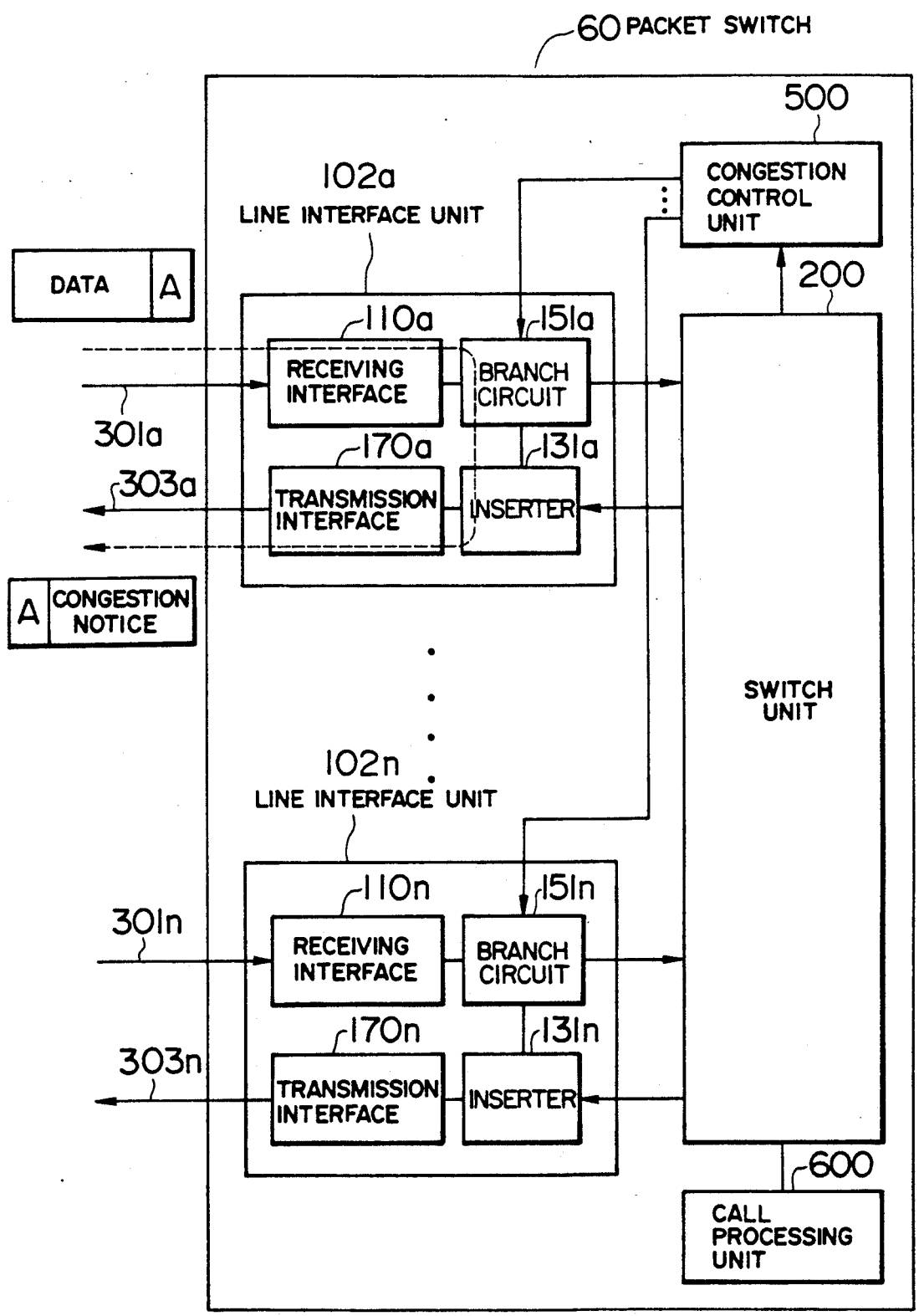
FIG. 18 is a diagram showing a second embodiment of the packet switch according to the present invention.

FIG. 18 shows a schematic diagram of an example of the packet switch 60 in accordance with the second embodiment in which a broken line indicates a flow of packets in the packet switch. In this diagram, the same reference numerals as those of FIG. 1 represent the same components. In FIG. 18, a packet switch 60 includes a line interface unit 102 for connecting a line to transmit a packet, a switch unit 200 for achieving switch processing for the line interface unit to output an inputted packet, a congestion control unit 500 for accomplishing a control for each line interface at a buffer congestion, and a call processing unit 600 for achieving call setup/release, etc.

In this embodiment, a branch circuit 151 and an inserter circuit 131 are disposed in each line interface unit such that at a congestion occurrence, a packet inputted from a line 301a is returned as a congestion control packet via the branch circuit 151 and the inserter circuit 131 to an output line 303a. That is, the characteristic resides in that the input packet is returned from the input line 301a to the output line 303a without achieving the switch operation of the input packet in the switch unit 200 so as to identify the congestion to the packet communication equipment operating as the transmission source.

(2) Switch unit 200

Figure 19:
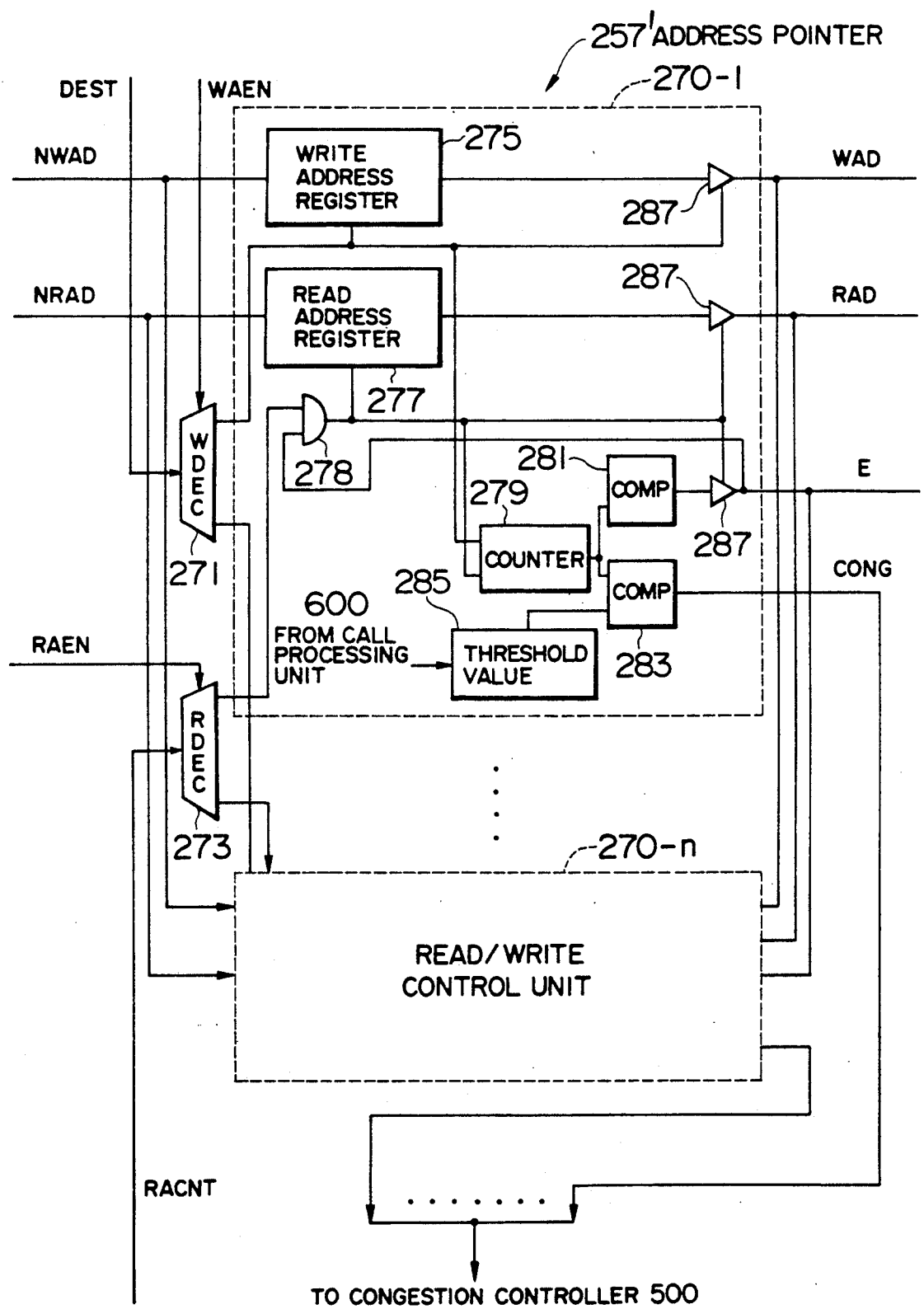
FIG. 19 is a diagram showing the configuration of an address pointer in the second embodiment.

Although the constituent elements of the switch of this embodiment are the same as those of FIG. 5, there exists a different point that an address pointer 257' inputs, as shown in FIG. 19, a congestion control signal (CONG) to the congestion controller.

(3) Congestion controller 500

FIG. 20 shows a configuration example of the congestion controller 500. The congestion controller 500 in this embodiment is responsive to a congestion control signal CONG outputted from the address pointer 257' of the switch unit 200 to output a control signal to a line interface unit 102 (102a to 102n) to produce a congestion control packet The congestion controller 500 includes a control processor (CPU) 51 for monitoring congestion and for controlling each line interface unit 102, a program memory 52, a control table memory 53, a status register 55 for storing a flag indicating whether or not a congestion has occurred in association with each output line, and a control register 57 having a storage area for each input line. The control table stored in the memory 53 includes storage areas 53a to 53n corresponding to the respective output lines as shown in FIG. 21, namely, for each output line, there is stored a record including a logical channel number (LCN) 53-1 of a packet to be outputted to the output line, an input line number 53-2, and an output value 53-3 to be set to the control register 57. By the way, the control table 53 is loaded, at a call setup time, with a new record by the call processing unit 600; whereas at a call release time, a record associated with the call is released by the call processing unit 600.

(4) Line interface unit 100

Figure 22:
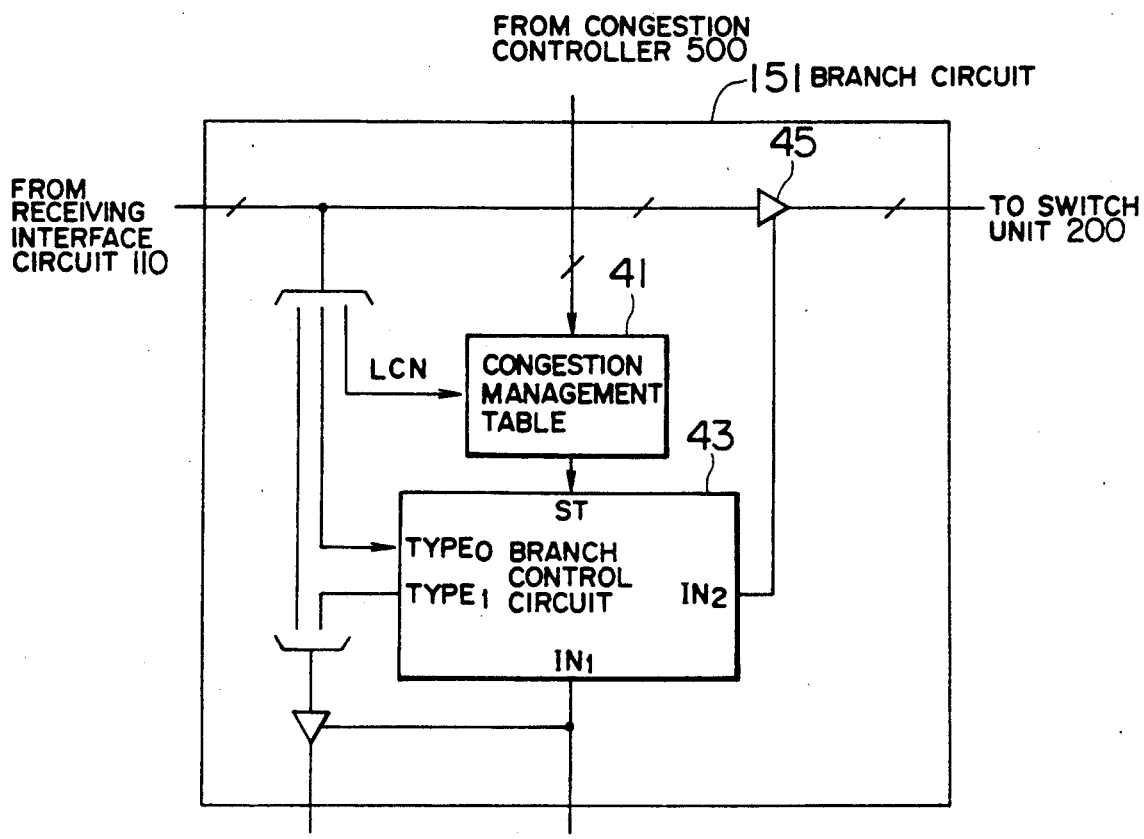
FIG. 22 is a diagram showing a branch circuit 151 in the second embodiment.

FIG. 22 shows the branch circuit 151 as the primary portion of the line interface unit. In this embodiment, the branch circuit 151 comprises a congestion management table 41 to be updated by the congestion controller 500, a branch control unit 43, and a 3-state gate 45. The congestion management table 421 is similar to the congestion table 183 of the first embodiment and has a constitution of FIG. 23.

FIG. 24 is a function table 910 representing a control operation by the branch control unit 43. An input packet is transferred to the switch unit 200 or the inserter circuit 131 according to the logic listed therein.

Figure 25:
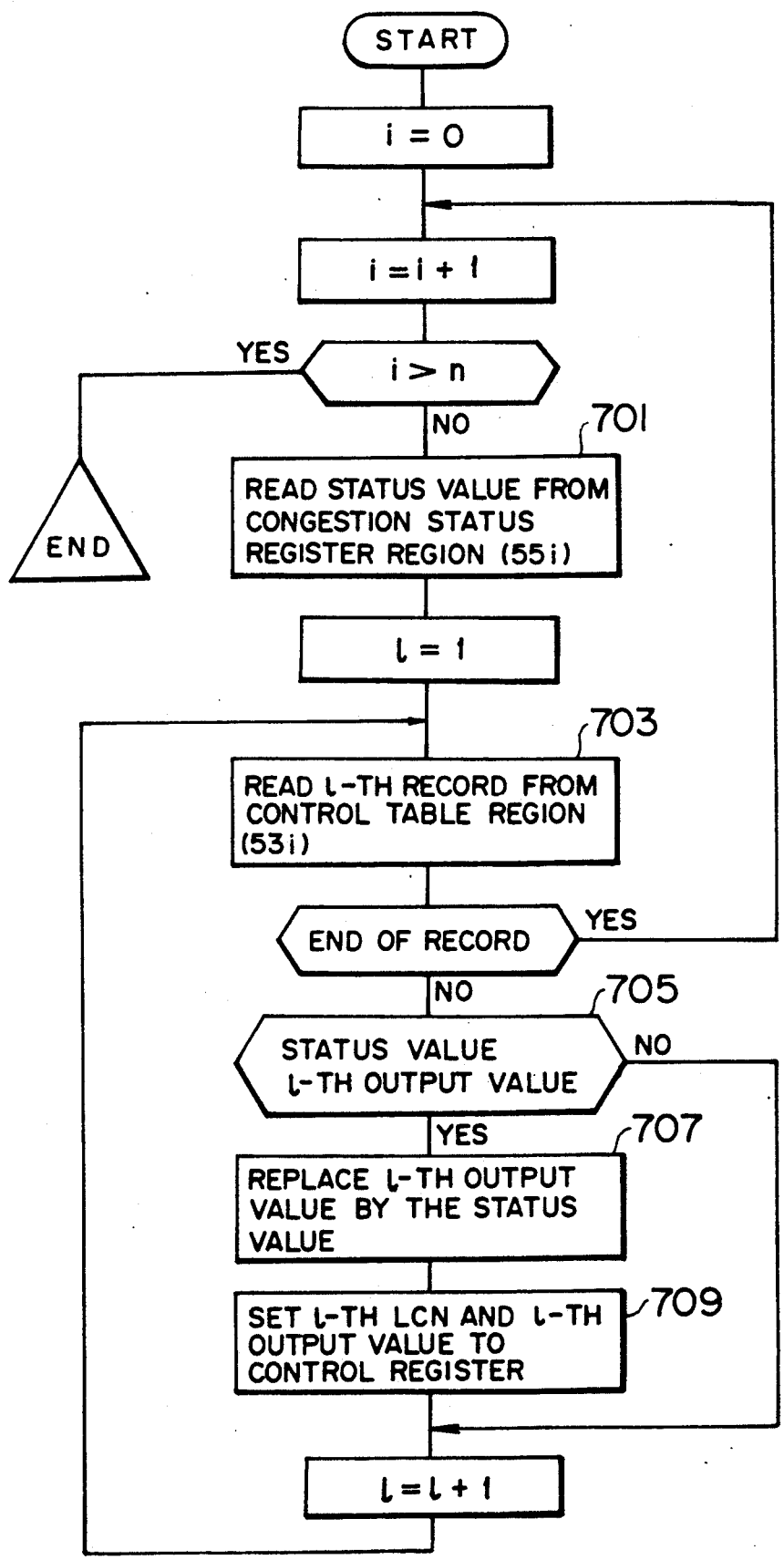
FIG. 25 is a flowchart for explaining processing operations in the second embodiment.

Next, by using the flowchart of FIG. 25, a description will be given of processing of the congestion controller 500 in the second embodiment.

In the switch unit 200, when a congestion is detected on either one of the output lines by means of the congestion detector 223 (elements 279 to 285), a flag bit "1" denoting a congestion state is stored in the congestion status register 55 in association with the output line. The control processor 51 executes the following sequence in a periodic manner. First, the processor 51 reads out a value (flag) of a congestion status register area 55i corresponding to an output line (step 701) so as to next sequentially reads out records stored in the control table region 53i associated with the output line (step 703). In this situation, when the output value 53i-3 of the record read from the control table is different from the value read from the congestion status register 55 (step 705), the output value 53-i is replaced with the value read from the congestion status rgister 55 (step 707). Thereafter, the logical channel number (LCN) 53i-1 and the output value 53i-3 are written in the storage area 57i of the control register corresponding to the input line number 53i-2 of the record thus read out (step 709).

The steps 703 to 709 are repeatedly achieved for all records of the control table region 53i such that the operations above are repetitiously conducted for all control table regions 53a to 53n.

A packet inputted in a case where a congestion occurs in the switch unit and congestion information is written in the congestion table 53 by the congestion controller 500 may be inputted to the switch unit 200 for each packet type or may be returned as shown in the table 910 of FIG. 24.

Figure 26:
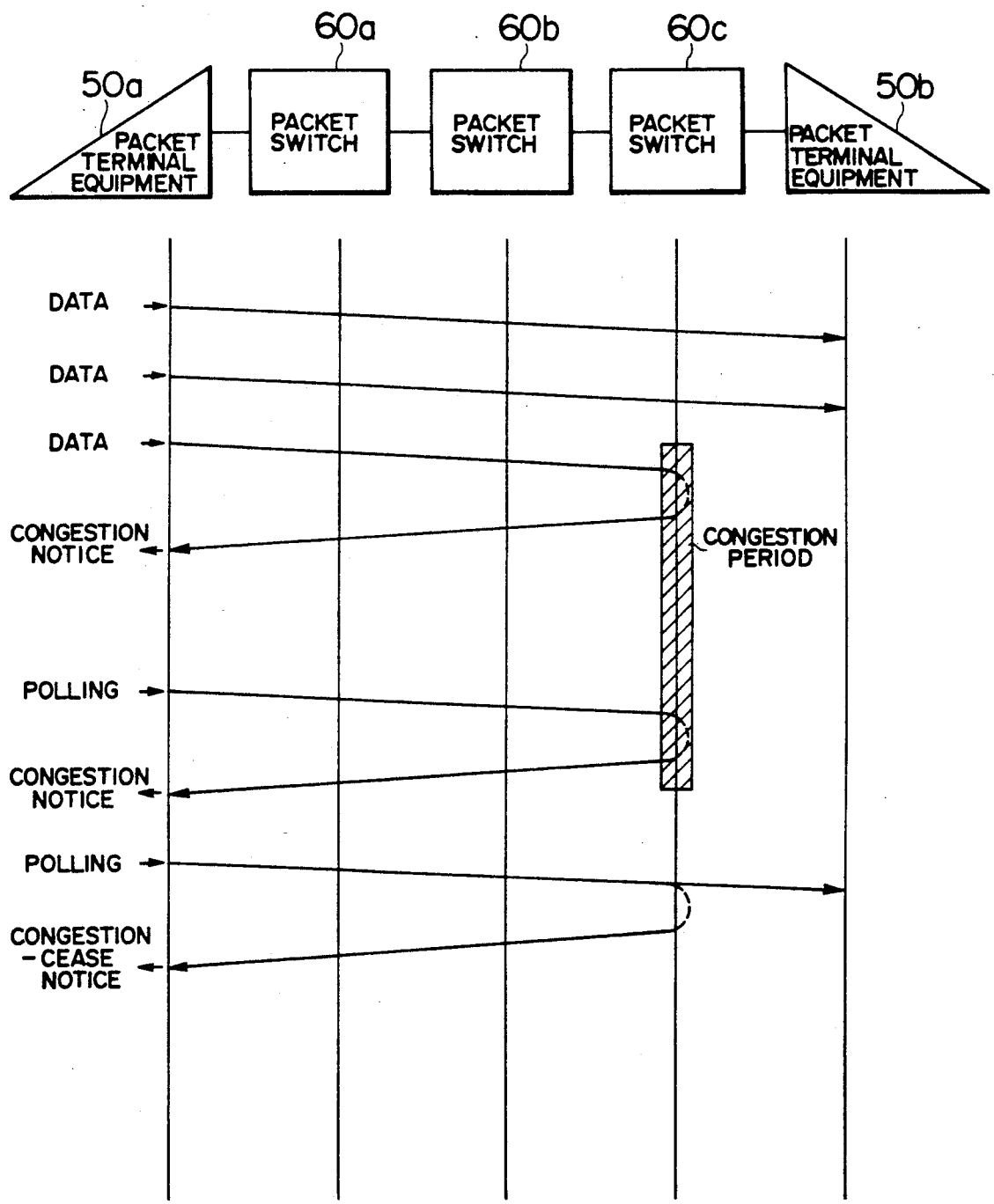
FIG. 26 is a diagram showing an operation sequence associated with packet switches and packet communication equipment in the second embodiment.

Referring next to the flowchart of FIG. 26, a description will be given of a packet communication to be conducted between the packet communication equipment 50 and the packet switch 60 by use of the above method.

When congestion takes place in the packet switch 60 while the packet communication equipment 50a is transmitting a data packet, the data packet does not undergo switch processing, but is returned as a congestion notice packet to the packet communication equipment 50a operating as the transmission source. The packet communication equipment 50a having received the congestion notice packet thereafter interrupts the transmission of a data packet so as to transmit a polling packet at a constant interval of time. If the congestion is continued in the packet switch, the polling packet is returned as a congestion notice packet After this point, when the congestion is ceased, if a polling packet is transmitted, the switch 60c transmits the polling packet to the destination packet communication equipment 50b and at the same time the packet is returned as a congestion cease notice packet in the line interface unit. As a result, the packet communication equipment 50a of the transmission source recognizes that the congestion has been eliminated.

As described above, in accordance with the present invention, at an occurrence of congestion in the switch, it is possible to transmit a congestion notice packet without inputting a packet in the switch unit. In consequence, the traffic is reduced in the switch unit and on the output line side. Furthermore, the packet switch returns data of the transmitted packet directly to the packet communication equipment of the transmission source without discarding the packet. Consequently, even if acknowledgment is not supplied from the packet communication equipment of the destination, the packet communication equipment of the transmission source can transmit again the data of which the transmission has been unsuccessful.

Next, referring to the drawings, a description will be given of a third embodiment as a variation of the first embodiment according to the present invention.

The overall configuration of the packet switch in this embodiment is the same as that of the configuration example shown in FIG. 1.

Although a switch unit 200 of this embodiment has a function identical to the function of the switch described in the first embodiment, there exists a slight difference in the constitution thereof.

Next, by using FIGS. 27 and 28, a description will be given of the configuration of the switch unit 200.

Figure 27:
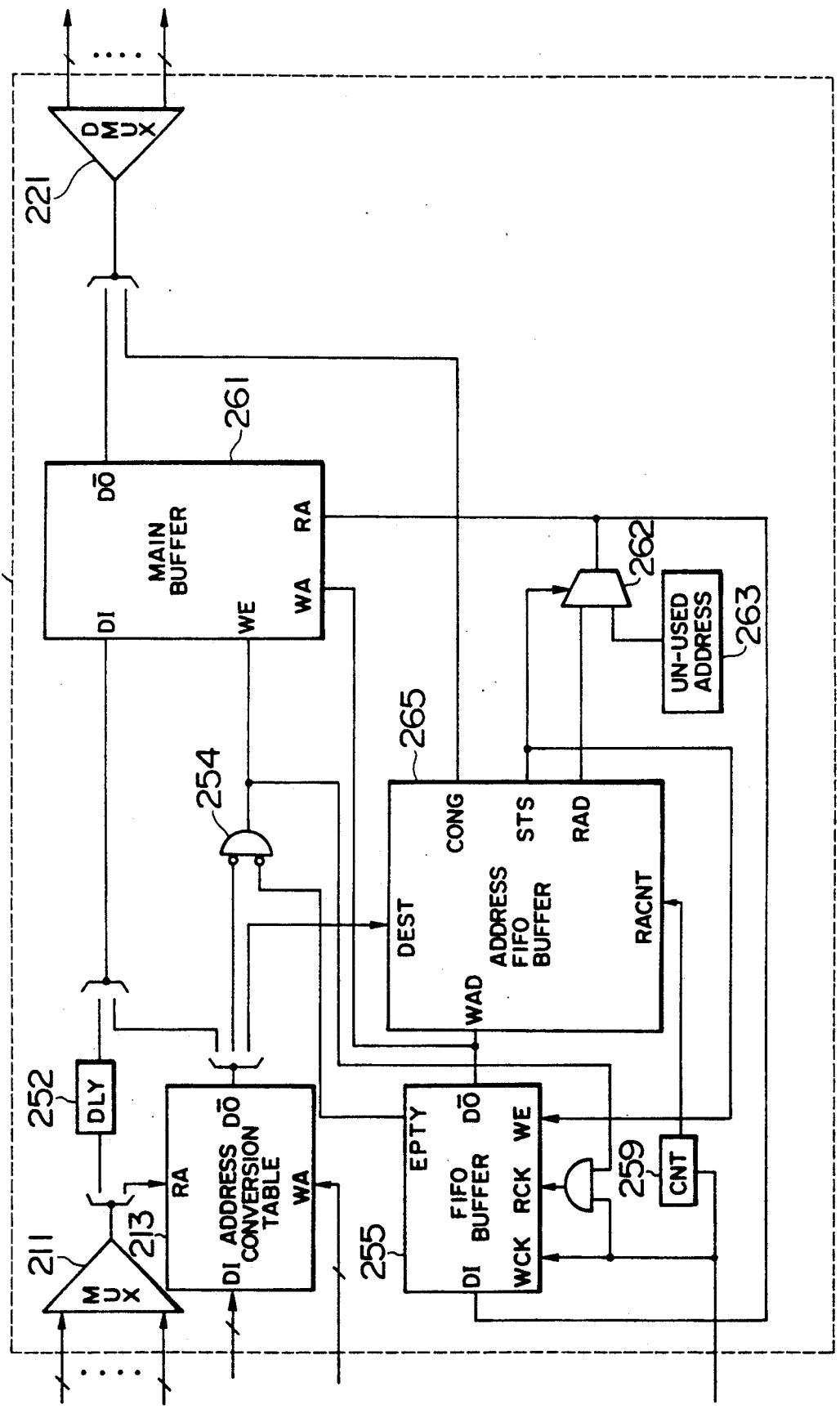
FIG. 27 is a diagram showing a switch unit in a third embodiment according to the present invention.
Figure 28:
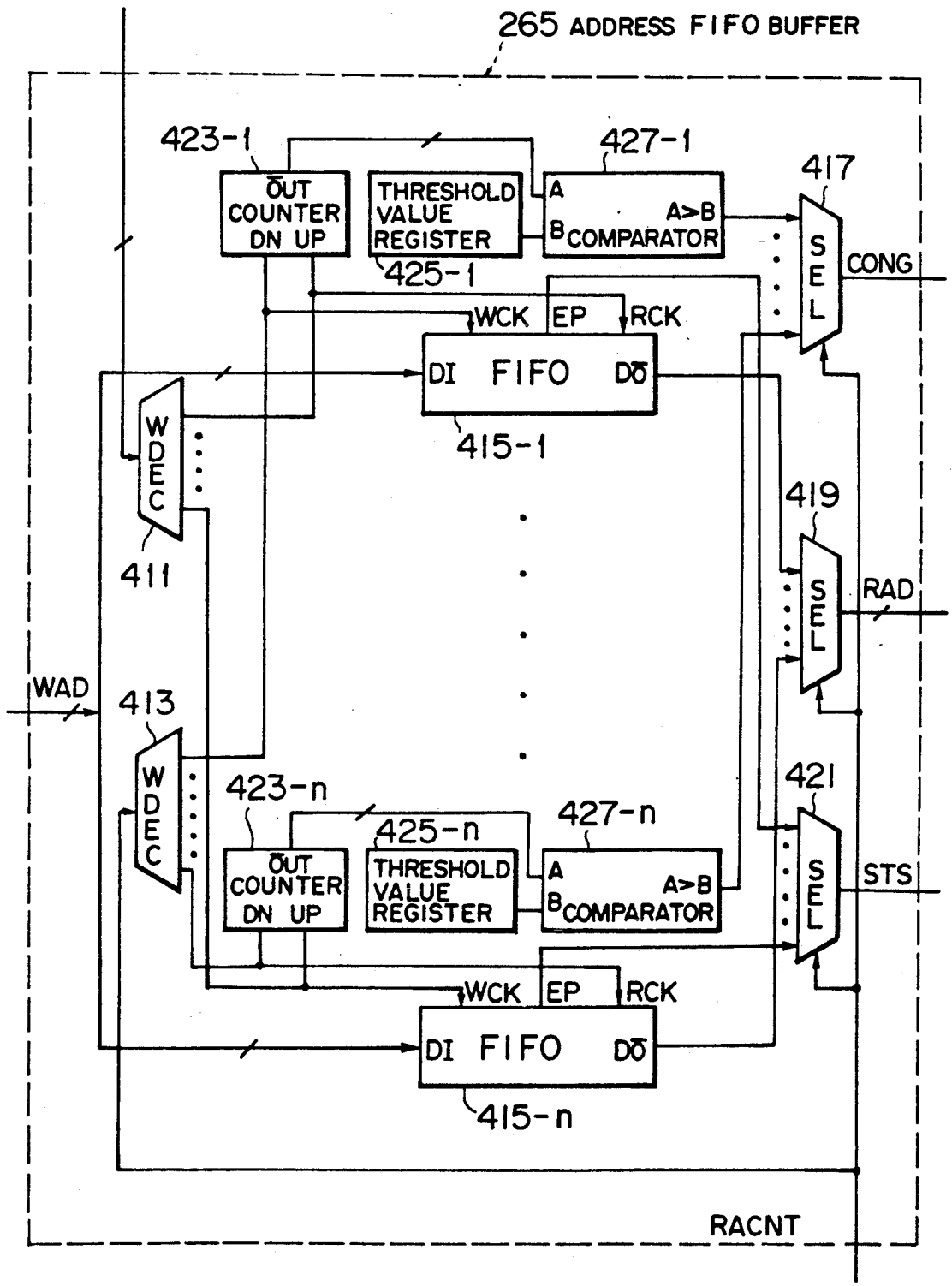
FIG. 28 is a diagram showing details of a group of address FIFOs 265 in FIG. 27.

The constitution of FIG. 27 is the same as that of FIG. 5 except for the group of address FIFOs 265, and the connection relationships are slightly different. In this diagram, the same reference numerals as those of FIG. 5 denote the same components. In FIG. 27, a data output (DO) from an idle address FIFO 255 is directly connected to a write address (WA) of the main buffer 61. Moreover, the system writes only the main portion of the packet in the main buffer 261, namely, the next address information is not written.

By use of FIG. 28, a description will be given in detail of the circuit of the group of FIFOs 265 of the switch unit. An output line number (DEST) outputted from the address translation table 213 is inputted to a write decoder 411. An output from the decoder is connected to an FIFO buffer 415 (415-1 to 415-n) corresponding to the output line. A data input (DI=WAD) to the FIFO buffer 415 is the data output (DO) from the idle address FIFO 255 of FIG. 27. The data output (DO) from the FIFO buffer 415 becomes a read address output (RAD) via a read address selector 419. An output from a read sequence decoder 413 is connected to an input of a read signal (RCK) of each FIFO buffer 415. An empty signal (EP) of each FIFO buffer becomes an output of a buffer empty signal to a signal line STS via an empty state selector 421.

A counter 423 measures the number of packets in the FIFO buffer 415 and is connected to the write signal (WCK) and the read signal (RCK) of the FIFO buffer. The counter 423 increments the value by one when a packet is written and decrements the value by one when a packet is read out. A comparator 427 compares the value of a threshold value register 425 with the value of the counter 423 so as to set via a congestion selector 417 the congestion signal output (CONG) to H when the counter 423 contains the greater value. Incidentally, the threshold value register 425 may be constantly loaded with a fixed value or may be appropriately rewritten by the call processing unit. With this provision, when a buffer is congested, the output congestion signal (CONG) can be set to H.

In this embodiment, since the processing of the call processing unit 600 and the line interface unit is entirely the same as that of the first embodiment, the description thereof will be omitted. By use of FIGS. 27 and 28, the operation of the switch unit will be described.

In FIG. 27, at a packet write time, an idle address is acquired from the idle address FIFO 255 so as to directly use the address as a write address of the main buffer 261. Simultaneously, the address is written in an FIFO buffer 415 corresponding to the output line number (DEST) in the group of address FIFOs 265 and then the value of the counter 423 is incremented by one. An address is sequentially acquired from the respective FIFO buffers 415 to read a packet from the main buffer 261 by use of the address as a read address. Each time the address is obtained from the FIFO buffers 415, the value of the counter 423 is decremented by one.

At a packet output to an output line, the comparator 427 compares the counter 423 value with the value of the threshold value register 285 so as to set the output of the congestion signal (CONG) to H when the number of packets in the buffer exceeds the threshold value. As a result, the congestion indicating region (CONG) of the packet format shown in FIG. 2B is set to "1" so as to be transferred to the line interface unit 110n.

Moreover, in other than the congestion state, the counter in the address FIFO group 265 is less than the threshold value; in consequence, the congestion indicating region (CONG) of the packet is set to "1" so as to be transferred to the line interface unit 110n.

With this provision, there can be achieved a congestion control identical to the congestion control of the first embodiment.

Next, referring to FIGS. 29 and 30, a description will be given of the fourth embodiment according to the present invention.

Figure 29:
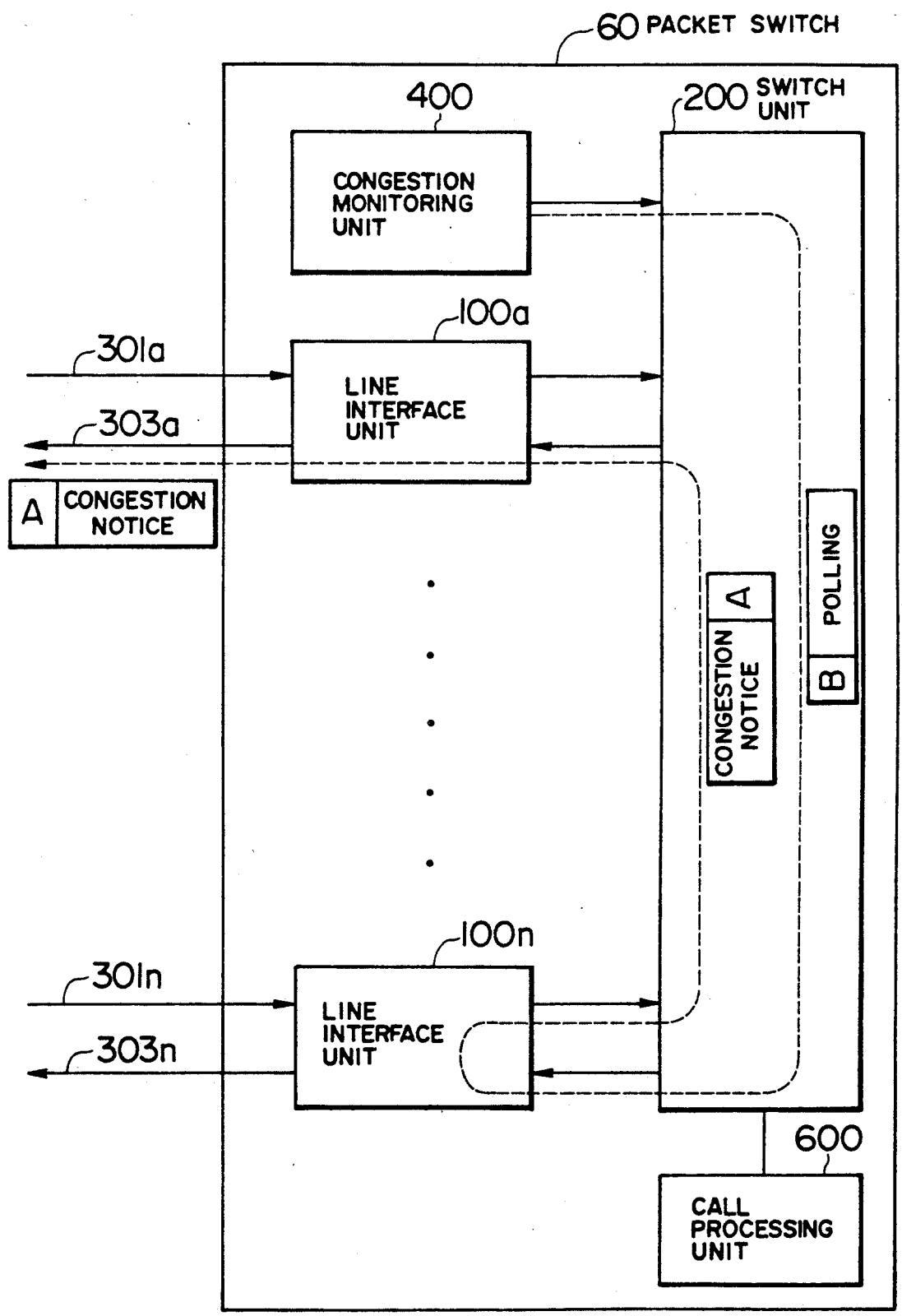
FIG. 29 is a diagram showing a packet switch in a fourth embodiment according to the present invention.
Figure 30:
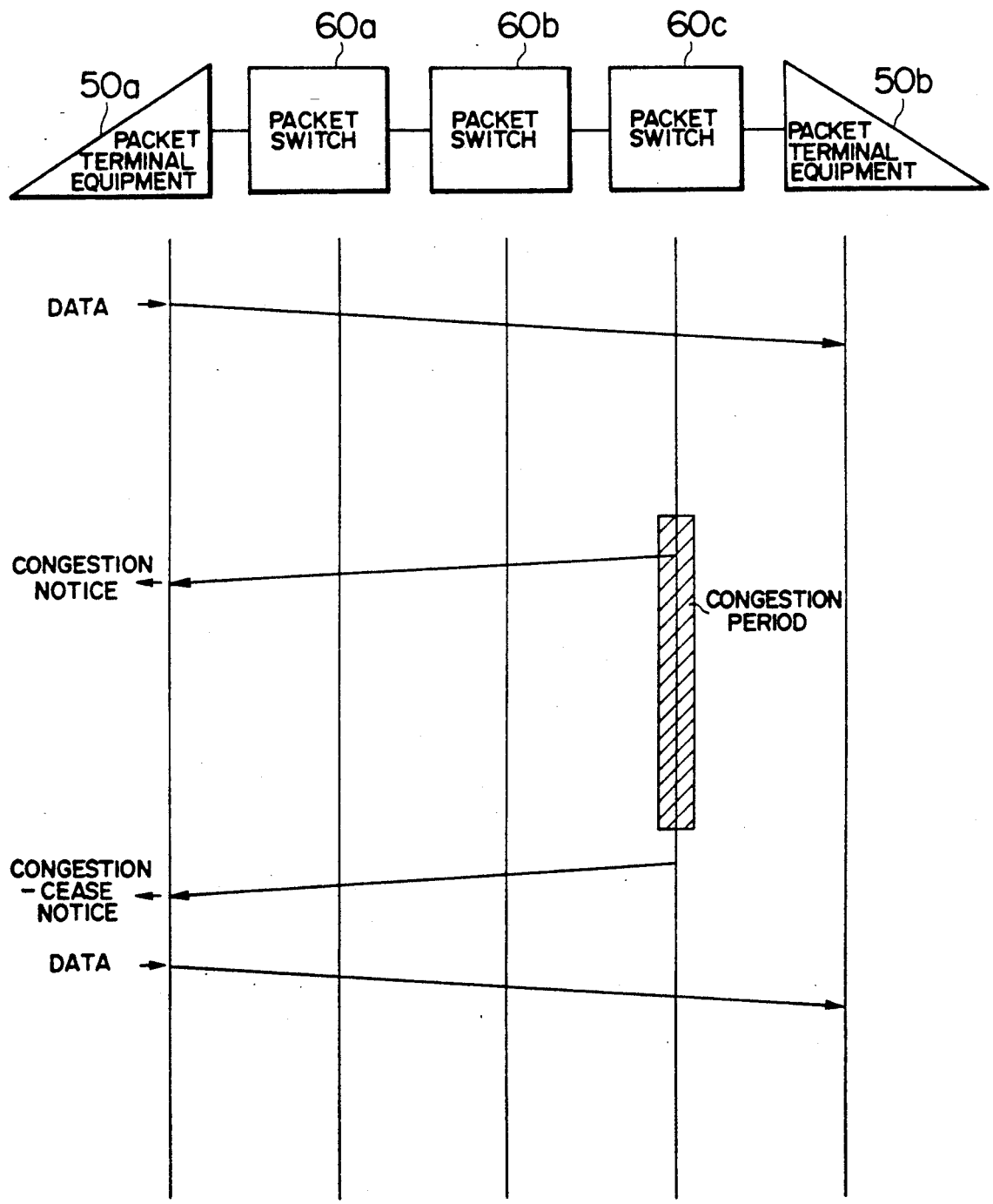
FIG. 30 is a diagram showing an operation sequence associated with packet switches and packet communication equipments in the fourth embodiment.
Figure 31:
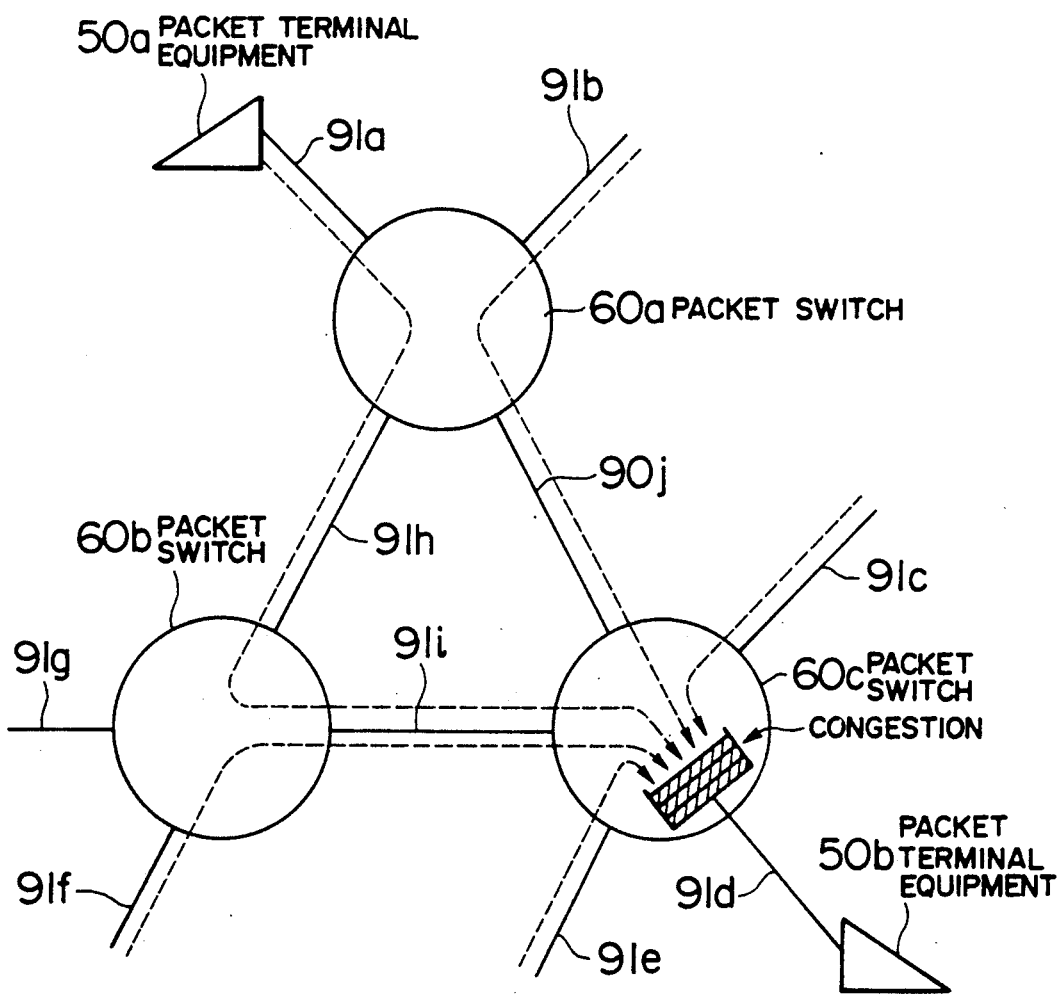
FIG. 31 is a diagram for explaining the principle of a congestion occurrence in a packet communication system.

FIG. 29 shows an example of the packet switch of this embodiment in which a flow of packets in the packet switch is also indicated by a broken line. The packet switch of FIG. 29 includes a line interface unit 100 for connecting a line for a packet transmission, a switch unit 200 for accomplishing a switch processing onto the line interface unit to output an inputted packet, a congestion monitoring unit 400 for monitoring and for controlling a congestion state, and a call processing unit 600 for achieving call setup/release, etc.

In this embodiment, a characteristic of the invention resides in the fact that the congestion monitoring unit 400 is connected, like each line interface unit 100, to the switch unit 200 such that the congestion monitoring unit 400 inputs a polling packet to the switch unit 200. By the way, the function of the line interface unit 100 is the same as that of the first embodiment.

When congestion occurs in the packet switch of this embodiment, the packet switch conducts an operation to send a congestion indicator packet to the packet communication equipment operating as the transmission source as follows.

The congestion monitoring unit 400 inputs a polling packet at a fixed interval to the switch unit 200 in place of the packet switch 50 so as to monitor a congestion for each logical channel number (LCN), thereby transmitting a congestion notice/cease notice packet to the packet communication equipment of the transmission source like in the case of the first embodiment.

Based on the sequence chart of FIG. 30, a description will be given of an example of packet communication between the packet communication equipment 50 and the packet switch 60 in this embodiment.

The packet switch 60c sends at the time of congestion a congestion notice packet to the packet communication equipment 50a associated with the LCN of the polling packet outputted from the congestion monitoring unit 400. On receiving the packet, the packet communication equipment 50a temporarily stops the transmission of a data packet. Thereafter, when the congestion is removed, the packet switch 60c transmits to each packet communication equipment a congestion cease notice packet produced from the polling packet outputted from the congestion monitoring unit 400. In consequence, when the packet is received, the respective packet communication equipment can restart the data packet transmission.

In this fashion, the congestion monitoring unit 400 inputs a polling packet such that when a congestion occurs in a buffer corresponding to an output line, the line interface unit 100 produces the congestion notice/cease notice packet from the packet to return the produced packet, thereby identifying the congestion notice/cease condition to the packet communication equipment operating as the transmission source. In consequence, it is not necessary for the packet communication equipment to transmit a packet to send the congestion notice/cease notice packet By the way, the congestion monitoring unit 400 may be provided with a control information table, so that the polling packet is selectively transmitted to grant at time of congestion a transmission to the packet communication equipment without transmitting the congestion notice packet.

In the four embodiments describe above, descriptions have been given by use of a switch of a memory switch type; however, the congestion control method of the present invention is also applicable to a switch of an input buffer type, a switch of an output buffer type, and a switch employing a processor associated with a bus.

In accordance with the present invention, there is provided a method in which, at an occurrence of congestion in a packet switch, information indicating congestion is added to an inputted packet so as to check the congestion indicating region for each packet, thereby detecting congestion for each logical channel.

Furthermore, in addition to an operation to output the pertinent packet onto a line when the congestion is detected in the line interface unit based on the method above, a portion of a packet is rewritten to produce a packet for a congestion notice to be returned to the switch unit such that the returned packet undergoes again a switch processing, which enables the congestion to be instantaneously reported to the packet communication equipment operating as the transmission source to impose a restriction on that packet communication equipment for the packet transmission.

In addition, according to the present invention, also when the congestion is removed, a processing similar to that of the congestion notice is achieved, thereby reporting the congestion cease condition to the packet communication equipment operating as the transmission source.

Moreover, as in the case of the second embodiment, by disposing a congestion monitoring unit outside the switch unit, the packet switch can achieve a congestion notice and a congestion cease notice even when the packet communication equipment is not transmitting a packet.

Furthermore, as in the fourth embodiment, when the congestion controller detects congestion, the line interface unit changes the packet into a packet for a congestion notice so as to return the packet, which enables the congestion notice to be sent to the packet communication equipment operating as the transmission source prior to an input of the packet to the switch unit at the time of congestion; furthermore, also when the congestion is removed, a similar method may be used to notify the congestion cease condition.

As described above, in accordance with the present invention, by conducting a simple processing to return a packet in the line interface, a packet of a congestion notice and a packet of a congestion cease notice can be transmitted, which consequently, leads to an effect that the packet can be transmitted to the packet transmission equipment at a high speed.

Furthermore, the acknowledgment packet and the processing required in the prior art technology to add congestion information to a monitoring packet becomes unnecessary, thereby attaining an effect to reduce processing of the packet transmission equipment to transmit the acknowledgment packet and the monitoring packet.

Moreover, the packet communication equipment need not transmit the acknowledgment packet or the monitoring packet to send the congestion notice/cease notice packet to the packet communication equipment operating as the transmission source, which increases the transfer throughput in the packet communication network.

While particular embodiments of the invention have been shown and described, it will be obvious to those skilled in the art that various changes and modifications may be made without departing from the present invention in its broader aspects.

We claim:

1. A packet switching system comprising:
   a plurality of input lines;
   a plurality of output lines;
   switch means for selectively outputting to said output lines input packets from said input lines;
   means for detecting an occurrence of congestion and a cease of congestion of packets in association with each of said output lines; and
   means for generating a congestion control packet by adding a congestion indicator for indicating an occurrence of congestion or cease of congestion to a replica of an input packet to be sent out from an output line on which the occurrence of congestion or cease of congestion is detected by said detecting means and for returning said congestion control packet to an output line associated with a transmission source of said input packet;
   said transmission source operating to control packet flow rate of packets sent to said switch means after having received said congestion control packet thereby controlling the number of input packets to be newly sent on said output line on which congestion or cease of congestion was detected.

2. A packet switching system according to claim 1, wherein said switch means includes:
   (i) buffer memory means for storing therein packets inputted from said input lines; and
   (ii) counter means for counting the number of the packets stored in said buffer memory means for each of said output lines; and
   said congestion detecting means includes means for storing a predetermined threshold value of a number of packets previously given for use in discrimination of the congestion of packets and means for comparing a count value developed by said counter means with said predetermined threshold value.

3. A packet switching system according to claim 1, further comprising:
   means for adding congestion information to each input packet to be outputted to any one of said output lines before said input packet arrives at said generating means if the occurrence of congestion is detected on said one output line by said detecting means,
   said generating means relaying the input packet to one of said output lines and judging whether or not the input packet includes congestion information, thereby deciding whether said congestion control packet should be generated or not.

4. A packet switching system according to claim 3, further comprising a plurality of interface units each connected between said switch means and a pair of one of said input lines and one of said output lines, each of said interface units being provided with the function of said generating means for generating said congestion control packet, returning said generated congestion control packet to one of the other interface units via said switch means and for relaying an input packet and a congestion control packet received from said switch unit to an output line associated therewith.

5. A packet switching system according to claim 4, wherein each of said input packets includes a connection number uniquely assigned to each communication between a transmission source and a transmission destination by said packet switching system, and each of said interface units comprises memory means for storing the status of congestion of the output line associated therewith inn correspondence with connection numbers, means for updating the status of congestion in said memory means according to the contents of the congestion information added to said input packets to detect a change which has occurred in the status of congestion for each output line, and means for generating a congestion control packet when a change of the congestion status is detected on said memory means.

6. A packet switching system according to claim 3, wherein each of said input packets includes a connection number uniquely assigned to each communication between a transmission source and a transmission destination by said packet switching system, and said generating means comprises memory means for storing the status of congestion for each output line in correspondence with connection numbers, means for updating the contents of said memory means according to the contents of the congestion information added to said input packets to detect a change occurred in the status of congestion for each output line, and means for generating a congestion control packet when a change of the congestion status is detected on said memory means.

7. A packet switching system operable to inform transmission sources of an occurrence of packet congestion to make said transmission sources reduce the transmission rate of packets, comprising:
  a plurality of pairs of lines, each pair consisting of one input line and one output line;
  a plurality of line interfaces respectively disposed for each of said pairs of input and output lines;
  switch means for operating to switch packets between said line interfaces;
  means for detecting a packet congestion state in association with each output line in said switch means; and
  means for adding congestion information to a packet to be outputted through said switch means to an output line for which a congestion is detected by said detecting means;
  each line interface including means operative when a packet having congestion information is received for producing a congestion notice packet to be delivered to a transmission source of the packet;
  said congestion notice packet being delivered to said transmission source via said switch means and one of said output lines associated with said transmission source, whereby the number of input packets flowing into the congested output line is reduced after said transmission source has received said congestion notice packet.

8. A packet switching system according to claim 7, wherein said congestion notice packet producing means includes:
  packet branch means, disposed between an output line and said switch means, for relaying packets received from said switch means to another one of said output lines and for producing said congestion notice packet when said congestion information is detected in any one of said received packets; and
  packet insert means, disposed between an input line and said switch means for receiving said congestion control notice from said branch means and for returning said congestion notice packet to said switch means.

9. A packet switching system operable to inform transmission sources of an occurrence of packet congestion to make said transmission sources reduce the transmission rate of packets, comprising:
  a plurality of pairs of lines, each pair consisting of one input line and one output line;
  a plurality of line interfaces each provided for a respective one of said pairs of input and output lines;
  switch means for operating to switch packets between said line interfaces; and
  means for detecting packet congestion occurring in association with each of said output lines in said switch means;
  each of said line interfaces including means responsive to a control signal from said congestion detecting means for returning to the output line thereof a congestion notice packet created by adding a congestion indicator to an input packet from the input line thereof.

10. A packet congestion control method in a packet switching system including switch means accommodating a plurality of pairs of input and output lines respectively connected to a communication equipment or to another packet switching system such that packets inputted from either one of said input lines are temporarily stored in a buffer memory so as to thereafter output the packet to one of said output lines associated with a destination communication equipment of the packet, means for monitoring a congestion state of packets in the switch means for each of said output lines and means for generating congestion control packets, comprising:
  a step of storing in said buffer memory a packet inputted from any one of said input lines in association with an output line onto which the packet is to be outputted;
  a step of monitoring by said monitoring means, for each of said output lines, the number of packets existing in the buffer memory to be outputted to each output line to generate a state signal indicating whether or not there occurs packet congestion;
  a step of reading ut a packet to be outputted to one of said output lines from the buffer memory in an order of the output lines so as to transmit the read out packet to said one output line;
  a step of producing, when the state signal indicates an occurrence of congestion or cease of a congestion on either one of the output lines, a congestion control packet including a congestion state indictor by said generating means in response to the reception of the packet to be outputted to the output line to return the congestion control packet to an output line paired with the input line of the packet; and
  a step of forcing the communication equipment having received the congestion control packet to change a transmission rate of subsequent packets depending on a content of the congestion state indicator included in the congestion control packet, whereby the number of new input packets to be sent to the congested output line is reduced for a while by said communication equipment until said communication equipment is informed of the cease of the congestion by another congestion control packet issued by said generation means.

11. A method according to claim 10, wherein said packet switching system includes a plurality of line interface means respectively disposed for each of said pairs of input and output lines, said generating means being provided as part of said respective line interface means, and the generation and the return of the congestion control packet being achieved by the line interface means on an input side of a packet.

12. A method according to claim 10, wherein said packet switching system includes a plurality of line interface means respectively disposed for each of said pairs of input and output lines, said generating means being provided as part of said respective line interface means, and the generation of the congestion control packet being achieved by the line interface means on an output side of the packet so that the congestion control packet is transferred via the switch means to one of the output lines associated with the transmission source of the packet.

13. A method according to claim 12, wherein each line interface means performs a step of converting a first packet format effective on the input line side and on the output line side into a second packet format effective in the packet switching system and vice versa.

14. A method according to claim 10, wherein the communication equipment having received the congestion control packet operates, when a congestion state indicator contained in the congestion control packet indicates an occurrence of congestion, in a packet transmission mode in which an amount of packets to be transmitted is reduced, and operates, when a congestion state indicator indicates a cease of congestion, in a packet transmission mode, in which an amount of packets to be transmitted is increased to a level at which the transmission of packets has been carried out before the occurrence of the congestion.

15. A method according to claim 10, wherein the communication equipment having received the congestion control packet interrupts, when a congestion state indicator contained in the congestion control packet indicates an occurrence of congestion, the transmission of data packets and begins transmission of polling packets at a predetermined interval of time, and said packet switching system produces, when congestion ceases, a congestion control packet in response to the polling packet transmitted from the communication equipment to return the congestion control packet to the communication equipment.

* * * * *